United States Patent
Nagelsdiek et al.

(10) Patent No.: US 9,850,373 B2
(45) Date of Patent: Dec. 26, 2017

(54) CURABLE POLYMER MIXTURE

(75) Inventors: Rene Nagelsdiek, Hamminkeln (DE); Bernd Göbelt, Wesel (DE); Bärbel Gertzen, Emmerich (DE); Jörg Bömer, Wesel (DE); Jürgen Omeis, Dorsten-Lembeck (DE); Stephan Remme, Kamp-Lintfort (DE); Christian Biecker, Huenxe (DE)

(73) Assignee: BYK-Chemie, GmbH, Wesel (DE)

( * ) Notice: Subject to any disclaimer, the term of this patent is extended or adjusted under 35 U.S.C. 154(b) by 869 days.

(21) Appl. No.: 13/817,003

(22) PCT Filed: Aug. 3, 2011

(86) PCT No.: PCT/EP2011/003889
§ 371 (c)(1),
(2), (4) Date: Jun. 28, 2013

(87) PCT Pub. No.: WO2012/022436
PCT Pub. Date: Feb. 23, 2012

(65) Prior Publication Data
US 2013/0289195 A1 Oct. 31, 2013

(30) Foreign Application Priority Data
Aug. 18, 2010 (EP) .................................... 10008607

(51) Int. Cl.
| | | |
|---|---|---|
| *C08L 33/08* | (2006.01) | |
| *C08L 33/10* | (2006.01) | |
| *C08L 33/12* | (2006.01) | |
| *C04B 24/26* | (2006.01) | |
| *C04B 24/32* | (2006.01) | |
| *C04B 26/06* | (2006.01) | |
| *C08F 2/44* | (2006.01) | |
| *C04B 26/14* | (2006.01) | |
| *C08F 290/14* | (2006.01) | |
| *C08F 283/06* | (2006.01) | |
| *C08F 290/06* | (2006.01) | |
| *C08F 283/08* | (2006.01) | |

(52) U.S. Cl.
CPC ............ *C08L 33/12* (2013.01); *C04B 24/267* (2013.01); *C04B 24/2647* (2013.01); *C04B 24/2664* (2013.01); *C04B 24/32* (2013.01); *C04B 26/06* (2013.01); *C08F 2/44* (2013.01); *C08L 33/08* (2013.01); *C08L 33/10* (2013.01); *C04B 26/14* (2013.01); *C08F 283/06* (2013.01); *C08F 283/065* (2013.01); *C08F 283/08* (2013.01); *C08F 283/085* (2013.01); *C08F 290/062* (2013.01); *C08F 290/142* (2013.01)

(58) Field of Classification Search
CPC ... C04B 24/32; C04B 24/2664; C04B 24/267; C04B 24/2647; C04B 24/06; C04B 24/14; C08L 33/08; C08L 33/10; C08F 283/06; C08F 283/065; C08F 283/08; C08F 283/085; C08F 290/062; C08F 290/142
See application file for complete search history.

(56) References Cited

U.S. PATENT DOCUMENTS

| | | | |
|---|---|---|---|
| 5,234,972 A | * | 8/1993 | Saitoh ................... C07C 69/593 523/118 |
| 6,875,801 B2 | | 4/2005 | Shendy et al. |
| 7,732,514 B2 | | 6/2010 | Rothon et al. |
| 8,153,722 B2 | | 4/2012 | Nagelsdiek et al. |
| 2003/0187101 A1 | | 10/2003 | Shendy et al. |
| 2005/0165144 A1 | | 7/2005 | Rothon et al. |
| 2009/0306252 A1 | | 12/2009 | Thetford |
| 2010/0016492 A1 | | 1/2010 | Nagelsdiek et al. |
| 2011/0190420 A1 | | 8/2011 | Nagelsdiek et al. |

FOREIGN PATENT DOCUMENTS

| | | |
|---|---|---|
| JP | 10-183012 | 7/1998 |
| WO | 03/080720 A1 | 10/2003 |
| WO | 2004/056445 A1 | 7/2004 |
| WO | 2008/049840 A1 | 5/2008 |
| WO | 2008/104378 A1 | 9/2008 |
| WO | 2010/020401 A2 | 2/2010 |

OTHER PUBLICATIONS

PCT/EP2011/003889—International Search Report, dated Nov. 3, 2011.
PCT/EP2011/003889—International Written Opinion, dated Nov. 3, 2011.
D.B. Johns, R.W. Lenz, and A. Luecke, "Lactones," *Ring-Opening Polymerization*, vol. 1, 1984, pp. 461-521, Elsevier Applied Science Publishers, New York, NY.
K. Geckeler, et al., "Functionalization of soluble polymers: 3. Preparation of carboxy-telechelic polymers," *Polymer Bulletin*, Nov. 1980, vol. 3, Iss. 6, pp. 347-352 (Abstract Only).
V. Yong, et al., "Monodisperse SiC/vinyl ester nanocomposites: Dispersant formulation synthesis, and characterization," Journal of Materials Research, Apr. 2009, vol. 24, Iss. 4, pp. 1553-1558 (Abstract Only).

(Continued)

*Primary Examiner* — Ling Choi
*Assistant Examiner* — David L Miller
(74) *Attorney, Agent, or Firm* — Curatolo Sidoti Co., LPA; Joseph G. Curatolo; Salvatore A. Sidoti

(57) ABSTRACT

The invention relates to a composite formulation comprising a specific mediator additive component (A) of relatively high molecular weight, a filler component (B) and a binder component (C). The composite formulation can be cured to a composite which is especially suitable for the production of moldings.

17 Claims, No Drawings

(56) References Cited

OTHER PUBLICATIONS

J. Marsden, et al., "Organofunction silanes—functions, applications and advantages," British Polymer Journal., Dec. 1979. vol. 11, Iss. 4, pp. 199-205 (Abstract Only).

S. Inoue and T. Aida, "Cyclic Ethers," *Ring-Opening Polymerization*, vol. 1, 1984, pp. 187-298, Elsevier Applied Science Publishers, New York, NY.

* cited by examiner

CURABLE POLYMER MIXTURE

CROSS REFERENCE TO RELATED APPLICATIONS

This application is a national stage application of International Application No. PCT/EP2011/003889, filed 3 Aug. 2011, which claims priority from European Patent Application No. 10008607.3, filed 18 Aug. 2010, from which applications priority is claimed, and which are incorporated herein by reference.

The invention relates to a composite formulation, a composite, and a use of the composite.

Curable polymer mixtures which contain so-called additives or fillers have a multitude of uses, among other things in the preparation of polymer concrete and other composite materials. The polymer acts as a binder which holds the inorganic additives and fillers, such as small rocks, together. The latter are usually used in the particle size range from ultrafine to coarse. With regard to the quality of the cured composite material (the composite as such), it is essential that it have good mechanical properties. Depending on the intended application in this connection, to improve the quality, it is especially desirable to optimize the bending strength, the tensile strength, the compressive strength, the impact-bending strength, and/or the modulus of elasticity. In practice such optimization is based especially on the use of mediator additives, which achieve better adhesion between the polymer and the filler.

In *British Polymer Journal* 1979, 11, 199, organofunctional alkoxysilanes are described as mediator additives that are used in filled resin systems. In addition to the limited storage stability of alkoxysilanes, which is considered problematic, as they have a tendency to undergo hydrolysis with splitting off of alcohol such as methanol or ethanol, an additional drawback of this class of compounds is the limitation of their use to fillers that react adequately with alkoxysilane groups.

JP 10183012 relates to the surface treatment of fillers with salts of phosphoric acid compounds that contain double bonds and thus describes an additional mediator additive type, characterized by its phosphoric acid groups. However, such mediator additives have the drawback that they poison the catalyst systems (such as cobalt complexes or amine catalysts) typically used for curing in practice, thus considerably interfering with curing to a composite.

In *Journal of Material Research* 2009, 24, 1553, the use of mono-2-methacryloxy ethyl succinate as a dispersant for silicon carbide nanoparticles in vinyl ester resins is described. This dispersant also has properties as a "coupling reagent," although it improves the mechanical properties of the composite only to a limited extent.

US 2005/165144 describes preparations in which, in addition to a plastic as a binder and a particulate filler, special modifiers are also present. The latter are linear molecules, each of which contains terminal ethylenically unsaturated double bonds and terminal carboxylic acid groups, which are separated from one another in each case by alkylene or alkenylene groups, wherein the alkenylene groups can optionally also be extended with a polyester group obtainable by ring-opening lactone polymerization. Examples mentioned for the modifier include carboxyalkyl maleimides and oligomeric ester compounds. The modifiers described in US 2005/165144 have the drawback that on one hand they are not particularly stable against hydrolysis (especially in the case of larger molecules which consequently contain a large number of ester groups) and on the other hand they are relatively susceptible to migration (especially in the case of smaller molecules with fewer ester groups).

WO 2008/049840 describes compositions which, in addition to a particulate filler and a plastic present as a binder, contain special modifiers. The latter have at least one lipophilic group with at least 6 C atoms, which is present as a substituent on a group derived from succinic anhydride. The lipophilic group mentioned especially includes long chain alkyl groups or anhydride-functional copolymers of maleic anhydride or anhydride-functional polyisobutylenes. One drawback of corresponding modifiers is that they are only compatible with a distinctly limited number of plastic systems.

The goal of the present invention was to supply filler- and binder-containing composite preproducts which can be cured in composites with good mechanical properties. A large range of different binder types should be able to be used while guaranteeing these good mechanical properties. In addition, the quality of the composites or composite components should be at least mostly maintained, even, insofar as possible, under relatively unfavorable conditions (for example, conditions in which—possibly even considered over long time periods—"hydrolysis reactions" would become noticeable), which can be of practical relevance during processing (the incorporation of the components and the curing are essential) and storage (aging).

The solution to this task is a composite preparation containing:
i) 0.01 to 10.00 wt % of a mediator additive component (A),
ii) 5 to 94 wt % of a filler component (B) and
iii) 5 to 94 wt % of a binder component (C),
wherein the mediator additive component (A) has a chemical structure containing the structural elements D, P and E in accordance with general formula (I)

$$[D]_a P[E]_b \qquad (I)$$

with
D the same or different and represented by a group containing an ethylenically unsaturated double bond, preferably selected from the groups comprising (D-I), (D-II), (D-III) and (D-IV)

(D-I)

(D-II)

(D-III)

(D-IV)

with $R^1$ the same or different and represented by hydrogen or $CH_3$; $R^2$ the same or different and represented by hydrogen or a branched or unbranched $C_1$-$C_{24}$-alkyl group, a the same or different and represented by an integer from 1 to 50, E the same or different and represented by hydrogen and/or a group containing a COOH group, preferably selected from the group comprising (B-I), (B-II), (B-III) and (B-IV)

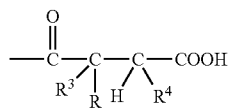
(B-I)

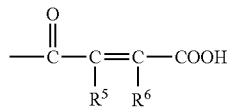
(B-II)

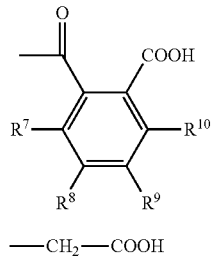
(B-III)

(B-IV)

with $R^3$ and $R^4$ in each case the same or different and represent hydrogen or a branched or unbranched $C_1$-$C_{12}$-alkyl group; $R^5$ and $R^6$ in each case are the same or different and represent hydrogen or a branched or unbranched $C_1$-$C_{12}$-alkyl group; $R^7$, $R^8$, $R^9$ and $R^{19}$ in each case are the same or different and represent hydrogen, COOH or a branched or unbranched $C_1$-$C_{12}$-alkyl group, b is the same or different and represents an integer from 1 to 50, P is the same or different and is represented by a branched or unbranched organic principal group, which contains at least two non-terminal ether oxygen atoms within this principal group, wherein the principal organic group represented by P has additional terminal oxygen atoms, the structural elements D and E are each bound directly to these terminal oxygen atoms, and a maximum of 70 mol % of the total structural elements E in the chemical structure according to the general formula (I) are H-atoms.

If b=1, because of the condition that a maximum of 70 mol % of the total structural elements E in the chemical structure according to general formula (I) are H-atoms, E is not hydrogen, but is a radical containing a COOH group.

The wording "same or different" relating to a generically defined structural element, a generically defined group or a number specifying repeat units is usually intended to mean that corresponding variation possibilities exist on one hand between different molecular species and on the other hand (if a variation possibility within a molecule comes under consideration at all), also within a molecular species.

By definition, no species are to be included in the filler component (B) which are species of the mediator additive component (A). The filler component (B) contains inorganic material (solid at room temperature and processing temperature) which may be present in fibrous and/or particulate form and can be introduced into the composite preparation. Normally the filler component (B) consists of inorganic material. The following should be taken as a basis for differentiating "inorganic" and "organic": inorganic material-containing elements and compounds which in each case contain no covalent carbon-hydrogen bonds. Thus graphite is considered as an inorganic material. Polystyrene or glucose, as carbon-hydrogen bond-containing species, are thus both organic.

The binder component (C) is made up of organic compounds (carbon-hydrogen bond-containing species) which are suitable as binders for composites and also, after curing of the composite (by polymerization), are constituents of a polymer matrix forming in the composite. Hydraulic inorganic binders, such as cement, are thus for example not to be considered as species of binder components (C). Typically a larger partial amount of the binder component (C) is present in the form of organic polymers, which after curing of the composite (most generally by cross-linking in the case of duromers and by solidification in the case of thermoplastics) form the polymer matrix. Frequently, the polymers mentioned contain double bonds (by means of which they can be polymerized in) or are accessible to grafting reactions (especially free radical grafting reactions—transfer reactions). The polymerization-starting initiators and other low molecular weight constituents, especially monomers polymerized in during polymerization, which after curing of the components (after polymerization) are constituents of the polymer matrix (thus are present covalently bonded in the polymer matrix) or likewise to be included in the binder component (C). Compounds that are part of the mediator additive component (A) or the filler component (B), purely by definition are not regarded as compounds of the binder component (C), although compounds of the mediator additive component (A), after curing to form the composite, are typically present as structural units polymerized into the binder polymer matrix.

By curing the composite preparation according to the invention, composites with particularly good mechanical properties can be produced. Furthermore, while at least partially guaranteeing these good mechanical properties, the binder can be selected from a relatively large variation range of binder types. An essential contribution is made to this by the mediator additive component (A) obtained according to the invention. Furthermore, the mediator additive component (A) does not cause any drawbacks during processing and curing of the composite preparation. The mediator additive component (A) also (probably at least also because of its relatively high molecular weight) demonstrates low volatility/migration tendency, which manifests positively in terms of health and environmental safety, surface properties of the finished composite, handling and economy (less is lost) among other things. In addition, it should be mentioned that the mediator additive component (A) is to be regarded as relatively "robust" and displays a relatively high stability during processing and storage (aging), especially toward the hydrolysis reactions that are often relevant in practice.

It should be mentioned that the mediator additive component (A) according to the invention, compared to the functional groups shown in the preceding in connection with the chemical structure of the mediator additive component (A), may also contain other types of functional groups. It is frequently preferred that the species of the mediator additive component (A) in each case contain no fewer ether oxygen atoms than the functional groups attributable to the other types of functional groups mentioned. Such other types of functional groups of the mediator additive component (A), for example, can be produced in that terminal OH groups (these are present especially when a partial amount of the structural element E is hydrogen) are reacted, for example by esterification, etherification or urethane group formation. Thus by means of corresponding reactions, organic radicals, especially also oligomeric and polymeric chain segments of high to low polarity, can be added to the principal molecule.

In a preferred embodiment, the composite preparation according to the invention contains i) 0.01 to 4.0 wt % of the mediator additive component (A), ii) 15 to 84 wt % of the filler component (B), and iii) 15 to 84 wt % of the binder component (C).

The composite composition according to the invention usually contains so-called auxiliaries, which are attributable to the filler component (B) (e.g., inorganic pigment particles with a basic surface for coloring the composite), the binder component (C) (e.g., initiator which after initiating the polymerization becomes a structural element of the developing polymer matrix), or neither of these components (e.g., inert, volatile solvents). Auxiliaries serve especially to enhance processability and improve the quality of the end products, the stabilization and curing.

The compound species corresponding to the mediator additive component (A) can be present in branched or linear form in each case. The branched species with branching sites in the structural element P usually contain more than one terminal structural element E and/or more than one terminal structural element D.

A preferred embodiment of the invention entails the fact that in the general formula (I) describing the chemical structure of the mediator additive component (A), D is preferably present as (DA) and/or (D-IV), a is represented by an integer from 1 to 8, the COOH group-containing radical is preferably present as (B-I) and/or (BA), and b is represented by an integer from 1 to 15, wherein a maximum of 50, preferably a maximum of 30, particularly preferably a maximum of 15 mol % of the total structural elements E in the chemical structure according to general formula (I) are H-atoms and the organic principal radical represented by P has a molecular weight of at least 200, and at least two of the nonterminal ether oxygen atoms within the principal radical are connected to one another over a bridging linear $C_2$-$C_5$ alkylene group segment of an unbranched or branched alkylene group (if this alkylene group is unbranched, this consists of the branching linear $C_2$-$C_5$ alkylene group segment).

Preferably the total quantity or a partial quantity of the mediator additive component (A) is present in the form of compounds (A'), in which the organic principal group representing the structural element P has structural units that are obtainable by ring-opening polymerization of cyclic ethers containing 3 to 6 ring atoms, wherein the principal organic group optionally contains additional structural units that can be produced by ring-opening polymerization of lactones containing 5 to 7 ring atoms.

Usually the said compounds (A') have respective structural segments of general formula (II)

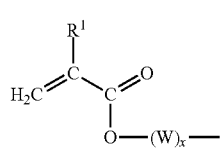

(II)

wherein $R^1$ is the same or different and is H or $CH_3$

W is the same or different and is a repeat structural unit, x is the same or different and is an integer from 3 to 100, wherein the repeat structural unit W is obtainable by ring-opening polymerization of a cyclic ether selected from the group comprising (W-I), (W-II), (W-III) and (W-IV)

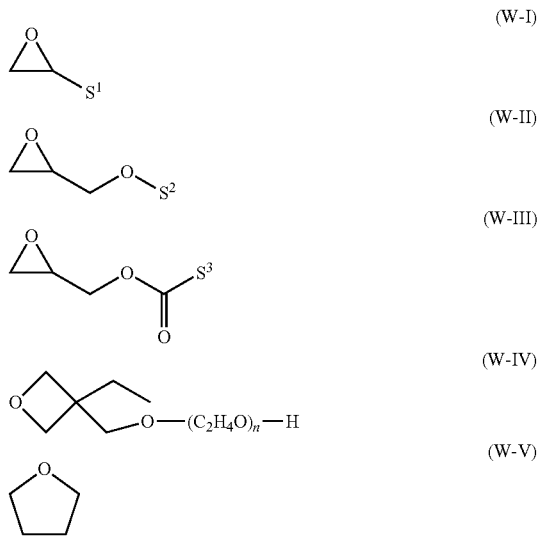

wherein $S^1$ is the same or different and is H, a linear or branched $C_1$ to $C_{24}$ alkyl group, a $C_6$ to $C_{18}$ aryl group, or a $C_6$ to $C_{18}$ arylalkyl group, preferably H, $CH_3$, $C_2H_5$ or $C_6H_5$, $S^2$ being the same or different and is H, a linear or branched $C_1$ to $C_{24}$ alkyl group, a $C_6$ to $C_{18}$ aryl group, or a $C_6$ to $C_{18}$ arylalkyl group, preferably H, $C_9$ to $C_{18}$-alkyl or $C_6H_5$, n is the same or different and is an integer from 0 to 10.

The ring-opening polymerization of cyclic ethers is generally known and is described for example in K. J. Ivin, T. Saegusa (ed.), *Ring-Opening Polymerization*, vol. 1, chapter 4: Cyclic Ethers (authors: S. Inoue, T. Aida), Elsevier Applied Science Publishers, London/New York 1984. The polymerization of cyclic ethers (lactones) is also known and is described for example in K. J. Ivin, T. Saegusa (ed.), *Ring-Opening Polymerization*, vol. 1, chapter 7: Lactones (authors: D. B. Jones, R. W. Lenz, A. Luecke), Elsevier Applied Science Publishers, London/New York 1984.

The mediator additive components (A) according to the invention and the species of the mediator additives (A') can be produced in various ways. Various possibilities are available, especially for introducing the structural element D and linking the structural element E.

The mediator additive component (A) can preferably be produced by a method having steps i) and ii), in which in step i) hydroxy-functional preproducts are produced by ring-opening polymerization of oxetanes optionally substituted with hydroxyl groups, wherein the ring-opening polymerization takes place by reacting an ethylenically unsaturated compound with at least one hydroxyl group and in step ii) the hydroxy-functional preproducts are reacted with cyclic carboxylic acid anhydrides.

As a rule, the oxetanes used in step i) are each present in the form of oxetanes substituted with hydroxyl groups, wherein for the compounds with at least one hydroxyl group used in step i), ethylenically unsaturated compounds, preferably hydroxyalkyl (meth)acrylate derivatives and/or allyl alcohol derivatives are selected, and the cyclic carboxylic acid anhydrides used in step ii) are normally present as cyclic aliphatic carboxylic acid anhydrides containing at least 4 carbon atoms.

These hydroxyalkyl (meth)acrylate derivatives are preferably represented by hydroxyalkyl (meth)acrylate itself and/or ether species that can be produced by alkoxylation of hydroxyalkyl (meth)acrylate and contain a maximum of 20 alkoxy structural units, preferably by hydroxyalkyl (meth) acrylate as such, and the allyl alcohol derivatives are usually present in the form of allyl alcohol as such and/or by alkoxylation of allyl alcohol, containing a maximum of 20 alkoxy structural units. Allyl alcohol as such and/or alkoxylation products of allyl alcohol with 1 to 9 structural units derived from ethylene and/or propylene oxide are the particularly preferred allyl alcohol derivatives.

Possibly, species of the mediator additive component (A), in addition to the structural units that result from the ring-opening polymerization of cyclic ethers, contain additional structural units that are accessible by ring-opening polymerization of lactones or can be produced by polycondensation with the participation of hydroxycarboxylic acids. It is known that structural units which are formally accessible by ring opening of the lactones, i.e., of a cyclic ester, are also analogously accessible by a condensation step with a corresponding hydroxycarboxylic acid wherein water is split off. In the area of hydroxy-functional carboxylic acids, the use of polyfunctional compounds, i.e., compounds with more than one OH group and/or more than one COOH group, such as citric acid, bis(hydroxymethyl)propionic acid or malic acid, is possible. The term lactones is also intended to include the cyclic esters of the carboxylic acids, for example ethylene carbonate, propylene carbonate or glycerol carbonate. Preferred in this connection are structural units derived from lactones with 5, 6 or 7 ring atoms, especially structural units derived from ε-caprolactone or δ-valerolactone.

It is known that corresponding oligomeric polymeric structures or with terminal double bonds and terminal OH groups are also commercially available as raw materials. A particularly large number of structures that have a terminal allyloxy, acryloyloxy or methacryloyloxy group, connected over the ether or ester group with a polyoxirane (preferably based on ethylene oxide and/or propylene oxide) or poly (tetrahydrofuran), is available. These can for example be obtained from NOF under the trade name of "Blemmer" or "Uniox" or from Cognis under the name of "Bisomer" or from Cray Valley under the name of "Sartomer" or from Rhodia as "Sipomer," as variants with a great variety of molecular weights and monomer compositions.

It is possible that such prepolymers with terminal double bonds and terminal OH groups can undergo chain extension by further ring-opening polymerization with cyclic ethers or lactones before a further reaction to structures with terminal carboxylic acid group takes place. Likewise the production of branched oligomeric or polymeric structures with terminal double bonds and several terminal OH groups on the basis of glycidol is known. Such compounds can also be used to produce the mediator additive component (A).

After the ring-opening polymerization of cyclic polyethers, optionally in combination with the ring-opening polymerization of lactones or the polycondensation of hydroxycarboxylic acids, with unsaturated hydroxy-functional compounds as reaction partners, an oligomer or polymer is obtained which in addition to an unsaturated end-group also has at least one terminal OH group. This OH group can now be converted to a carboxylic acid function.

The introduction of terminal carboxylic acid groups into hydroxy-functional compounds by reacting their OH groups with cyclic carboxylic acid anhydrides or by carboxymethylation is known to the person skilled in the art. In a particularly preferred variant, the terminal carboxylic acid group is formed by reacting the OH function with a cyclic carboxylic acid anhydride. Particularly preferred carboxylic acid anhydrides here are succinic anhydride, maleic anhydride, phthalic anhydride, and trimellitic anhydride and optionally their derivatives. Methods of introducing terminal carboxylic acid groups into hydroxy-functional compounds by reacting their OH groups with cyclic carboxylic acid anhydrides are presented, for example, in *Polymer Bull. (Berlin)*, 1980, 3, 347.

As an alternative preferred method for producing the mediator additive component (A), ring-opening polymerization should be mentioned, in which an at least difunctional hydroxy-functional compound is selected as the initiator molecule. Preferred initiator molecules in this case are polyethers, such as polyethylene glycol or polypropylene glycol. Cyclic ethers with three to five ring atoms are preferred as monomers suitable for ring-opening polymerization. Particularly preferred monomers are the cyclic ethers mentioned in the preceding, optionally in combination with corresponding lactones or hydroxycarboxylic acids.

As was already stated, in addition to structural units derived from these cyclic ethers, structural units may also be present which are obtainable from ring-opening polymerization of lactones or by polycondensation involving the corresponding hydroxycarboxylic acids, Such suitable hydroxycarboxylic acids can also contain more than one OH group and/or more than one COOH group. Lactones are also intended to include the cyclic esters of the carboxylic acids, thus for example ethylene carbonate, propylene carbonate or glycerol carbonate. Preferred in this connection are structural units derived from lactones with 5, 6 or 7 ring atoms, especially structural units derived from ε-caprolactone or δ-valerolactone.

In this way, oligomers or polymers are obtained which have at least two OH groups per molecule. The further conversion of these molecules now consists of the fact that some of the OH groups are converted to carboxyl groups in analogy to the previously described method and an additional fraction of the OH groups is converted by suitable reaction into a terminal structural element D which contains an ethylenically unsaturated double bond. The reaction sequence introducing these end groups is arbitrary, and is to be adapted to the respective general synthesis conditions. Thus either the terminal structural element D can be introduced first, and then the carboxylic acid groups, or vice versa, or simultaneously.

To convert a terminal OH group to a terminal structural element D, the usual methods known to the person skilled in the art may be used. Preferred methods are reacting the OH group with (meth)acrylic acid, the esters, halides or anhydrides thereof to (meth)acryloy end-groups, alkylation with allyl or vinyl halides to form allyl ether or vinyl ether end-groups, reaction with maleic acid, the anhydride or its anhydride or (half) esters or the reaction with fumaric acid or its (half) esters to form the corresponding unsaturated ester groups.

In a modification of this variant, as a method for manufacturing the mediator additive component (A) it is also possible to mention ring-opening polymerization, in which a monofunctional hydroxy-functional compound is selected as the initiator molecule, under the assumption that by suitably selecting the ring-opening monomers to be polymerized, branched structures with at least two hydroxyl groups per molecule will form. Preferred initiator molecules In this case are monohydroxy-functional polyethers, such as polyethylene glycol monomethyl ethers; polypropylene glycol monobutyl ethers, mixed polyethylene oxide-/polypropylene oxide monoalkyl ethers or so-called fatty alcohol alkoxylates (i.e., alkoxylates of $C_6$-$C_{24}$-monoalcohols). As monomers suitable for ring-opening polymerization, in this case as well cyclic ethers with 3 to 5 ring atoms are preferred. Particularly preferred monomers are the above-mentioned cyclic ethers, optionally in combination with corresponding lactones or hydroxycarboxylic acids. For the further reaction and especially the introduction of the terminal structural element D, the statements made above are applicable.

Preferably at least 60 wt % of the filler component (B) is present in the form of filler component species (B') which in each case according to DIN EN ISO 787-9 have a pH of at least 6.0, preferably at least 7.5.

As a rule, at least 60 wt % of the filler component (B) is present in the form of filler component species (B') which in each case contain carbonates, hydrogen carbonates, sulfates and/or hydrogen sulfates of the elements calcium, magnesium and/or aluminum; and/or oxides, hydroxides and/or oxide-hydroxides of aluminum; and/or mica and/or aluminosilicates and/or talc and/or silicas.

It is known that these compounds generally do not exist in 100% chemically pure form in nature, so that a fair amount of the cations and anions in these compounds may be respectively substituted by different metal cations or anions. In addition to natural ores, synthetically produced fillers, i.e., fillers obtained generally by precipitation reactions or pyrogenic methods, may be used.

The species of the filler components (B) are preferably characterized by the fact that these can be distributed in the matrix materials, i.e., can be arranged in a multiparticulate manner and are not soluble therein. Alternatively or additionally, the filler component (B) can contain a fibrous constituent insoluble in the matrix material. Dispersible inorganic fillers that may be used include: inorganic silicon-containing compounds, for example, quartz, crystobalite, pyrogenic silica, precipitated silicas, wollastonite, kaolin, silicon carbide, mica, and talc, preferably as rock particles in all size ranges, i.e., from the ultrafine particle range to a coarse rock particle range; silicon-containing compounds in the form of cut and continuous fibers (wherein the continuous fiber form also includes fiber strands, fiber bundles, woven and non-woven fabrics, and the continuous fibrous fillers optionally may also be used in combination with a particulate filler), and in the form of solid and hollow beads; oxygen-containing inorganic compounds of magnesium, calcium, barium (such as their optionally mixed carbonates, hydrogen carbonates, sulfates, hydrogen sulfates, or phosphates, (di)hydrogen phosphates, oxides, hydroxides, etc., also as marble sand, chalk, limestone, dolomite, gypsum, magnesium hydroxide); inorganic aluminum compounds, preferably aluminum hydroxide (e.g., hydragillite or gibbsite), aluminum oxides (e.g., corundum, emery) and aluminum oxide-hydroxides (e.g., bauxite, bohmite, diaspore) and/or carbon fiber and carbon nanotubes.

The fillers can also be surface-modified.

Usually, particulate or powder fillers are used. The particle size diameters (in the case of particles) typically amount to 50 nm to 5 cm, frequently 100 nm to 2 cm, particularly frequently 1 μm to 1 cm and very particularly frequently 10 μm to 5 mm.

The binder component (C) frequently contains at least 60 wt % of duromer preproducts (C') curable by free radical polymerization and/or free radical cross-linking, selected from the group consisting of ethylenically unsaturated polymers, (meth) acrylate resins, ethylenically unsaturated monomers, free radical initiators and optionally cross-linking agents.

In a typical embodiment of the invention, the binder component (C) contains at least 90 wt % polymer matrix preproduct consisting of the following components:

(meth)acrylic resins and/or unsaturated polyester resins,
ethylenically unsaturated monomers, preferably styrene, substituted styrenes, (meth)acrylates and/or (meth) acrylamides,
species suitable as free radical initiators, preferably peroxide compounds and
optionally, cross-linking agents selected from di-, tri-, and higher-functional (meth)acrylates, di-, tri- and polyvinyl-substituted benzene derivatives, di-, tri- and higher-functional vinyl or allyl (poly) ethers.

The polymeric binders form the polymer matrix in which the fillers are distributed. These binders are typically cured by free radical processes involving ethylenically unsaturated compounds (duromers), or are thermoplastics in which graft reactions occur in the presence of free radicals under the respective processing conditions. Suitable thermoplastic binders are homopolymers and copolymers of α-olefins which react during processing, especially in extruders, with ethylenically unsaturated compounds, optionally in the presence of free radical initiators in the framework of graft reactions.

Preferred polymeric species of the binder component (C) are duromers. Particularly frequently used species of binder components are (meth)acrylate resins, which are sometimes also designated as methacrylate/acrylate reaction resins, and the unsaturated polyester resins, which may also include the so-called vinyl ester resins. Ethylenically unsaturated polyester resins are preferably obtained by reacting singly unsaturated dicarboxylic acids with diols, optionally also using saturated carboxylic acids or (di)cyclopentadiene. Particularly preferred difunctional ethylenically unsaturated carboxylic acids or derivatives thereof used for this purpose are maleic acid and fumaric acid as well as maleic anhydride. However, difunctional saturated carboxylic acid components that may also be used also include adipic acid, tetrahydrophthalic acid, phthalic acid, isophthalic acid, terephthalic acid, HET-acid (hexachloro-endomethylene tetrahydrophthalic acid) and glutaric acid as well as the anhydrides of these carboxylic acids or Diels-Alder adducts of maleic anhydride and cyclopentadiene. In the production of unsaturated polyester resins, acrylic acid and methacrylic acid may be used additionally. Difunctional alcohol components preferably used also include propylene, dipropylene-, ethylene-, diethylene- and neopentyl-glycol, as well as 1,4-butanediol, 1,6-hexanediol, alkoxylated bisphenol A and 2,2,4-trimethylpentane-1,3-diol.

In addition to difunctional carboxylic acids and alcohols, higher functional carboxylic acids and alcohols may also be used to obtain branched polycondensation products.

Suitable unsaturated polyester resins also include vinyl ester resins obtainable by reacting epoxy resins with unsaturated monocarboxylic acid esters, for example, (meth) acrylic acid.

The following may also be mentioned as polymers particularly suitable for the system intended to undergo free radical polymerization: (meth)acrylic resins, such as poly(meth)acrylates, poly(meth)acrylamides or copolymers of (meth) acrylates/(meth)acrylamides. For this polymer basis, known cross-linking compounds, preferably di-, tri- and higher-functional (meth)acrylates, e.g., ethylene glycol di(meth) acrylate, propylene glycol di(meth)acrylate, 1,4-butane diol di(meth)acrylate, 1,6-hexane diol di(meth)acrylate, diethylene glycol di(meth)acrylate, dipropylene glycol di(meth)acrylate, glycerol tri(meth)acrylate, trimethylolpropane tri(meth)acrylate, triethylene glycol di(meth)acrylate, and tripropylene glycol di(meth)acrylate, preferably in quantities of up to 7.5 wt %, more preferably up to 5 wt %, based on the total weight of the binder component, may additionally be used.

In addition the binder component typically contains at least one ethylenically unsaturated monomer, preferably optionally substituted styrenes, (meth)acrylates, (meth)acrylamides or mixtures thereof, preferably in a quantity of up to 55 wt %, preferably up to 45 wt %, based on the total weight of the binder component.

Frequently the binder component (C) contains special methacrylate/acrylate reaction resins, which contain the following as component types:
- a polymer component: typically copolymers with high fractions of methyl methacrylate, copolymerized with alkyl(meth)acrylates, such as methyl acrylate, ethyl (meth)acrylate, butyl(meth)acrylate, 2-ethylhexyl (meth) acrylate (these copolymers are preferably produced by bulk or bead polymerization and usually have weight-average molecular weights between 50,000 and 1,000,000),
- one or more (meth)acrylic monomers such as methyl (meth)acrylate, butyl(meth)acrylate, 2-hydroxyethyl (meth)acrylates, 2-ethylhexyl(meth) acrylates, 3,3,5-trimethylcyclohexyl(meth)acrylate and
- one or more (meth)acrylic cross-linking agents, such as ethylene glycol di(meth)acrylate, 1,4-butanediol di(meth)acrylate, polyethylene glycol di(meth)acrylate, polypropylene glycol di(meth)acrylate, trimethylolpropane tri(meth)acrylate and/or poly(meth)acryl-functional polyurethane (meth) acrylate.

It is known that by means of a suitable composition of these component types mentioned, the property profile (of the duroplast obtained) can be varied as desired. Essential criteria in this connection include shrinkage upon curing, mechanical properties, surface adhesion, internal plasticization, degree of cross-linking, and odor as well as the rheology of the binder system prior to complete curing.

Alternative polymeric binders that may be considered include thermoplastics, which can react with ethylenically unsaturated compounds within the framework of free radical reactions under the processing conditions selected. As a rule these are homo- and copolymers of α-olefins with 2 to 12 C-atoms, typically homo- and copolymers of ethylene and propylene.

The invention also relates to a composite obtainable by curing the above-described composite preparation.

As a rule, free radical initiators are used for polymerizing the binder components. Suitable free radical initiators are especially organic peroxides and azo compounds, preferably organic peroxides. The selection of the free radical initiator is made out according to the curing temperature. Preferably used as free radical initiators are methyl ethyl ketone peroxide, dibenzoyl peroxide, lauryl peroxide, dicumyl peroxide, cumene hydroperoxide, t-butylperbenzoate, and 1,1-di-(t-butylperoxy)-3,3,5-trimethylcyclohexane. Additional suitable free radical initiators are, for example, diisobutyryl peroxide, cumyl peroxy neodecanoate, 1,1,3,3-tetramethylbutyl peroxy neodecanoate, di-n-propyl-peroxydicarbonate, tert-amyl peroxy neodecanoate, di-(4-tert-butyl-cyclohexyl)-peroxy dicarbonate, di-(2-ethylhexyl)-peroxy dicarbonate, tert-butyl peroxy neodecanoate, di-n-butyl peroxydicarbonate, dicetyl peroxydicarbonate, dimyristyl peroxydicarbonate, 1,1,3,3-tetramethylbutyl peroxypivalate, tert-butyl peroxy neoheptanoate, tert-amyl peroxypivalate, tert-butyl peroxypivalate, di-(3,5,5-trimethylhexanoyl)-peroxide, dilauroyl peroxide, didecanoyl peroxide, 2,5-dimethyl-2,5-di(2-ethylhexanoyl peroxy)-hexane, 1,1,3,3-tetramethylbutylperoxy-2-ethyl hexanoate, tert-amylperoxy-2-ethyl hexanoate, tert-butylperoxy-2-ethyl hexanoate, tert-butylperoxy diethyl acetate, tert-butylperoxy isobutyrate, 1,1-di-(tert-butylperoxy)-3,3,5-trimethylcyclohexane, 1,1,-di-(tert-butylperoxy)-cyclohexane, tert-amylperoxy-2-ethyl hexyl carbonate, tert-butylperoxy-3,5,5-trimethyl hexanoate, 2,2-di-(tert-butylperoxy)-butane, tert-butylperoxy isopropyl carbonate, tert-butylperoxy-2-ethylhexyl carbonate, tert-butylperoxy acetate, tert-butylperoxy benzoate, di-tert-amyl peroxide, di-(2-tert-butyl peroxy isopropyl benzene, 2,5-dimethyl-2,5-di-(tert-butylperoxy) hexane, tert-butyl-cumyl peroxide, 2,5-dimethyl-2,5-di(tert-butylperoxy) hexyne-3, di-tert-butyl peroxide, 3,6,9-triethyl-3,6,9-trimethyl-1,4,7-triperoxonane, di-isopropyl benzene-monohydroperoxide, p-menthane hydroperoxide, cumyl hydroperoxide, 1,1,3,3-tetramethyl butyl hydroperoxide, tert-butyl hydroperoxide, tert-amyl hydroperoxide, methyl isobutyl ketone peroxide, acetyl acetone peroxide, cyclohexanone peroxide, and other perketal peroxides, perester peroxides, as well as peroxycarbonates and mixtures of these free radical initiator species.

Depending on the curing conditions, if desired a "usual" accelerator may also be used to enable free radical polymerization and complete curing of the binder component even at low temperatures, i.e., without external heat supply. The "usual" accelerators mentioned are amino group-containing compounds, preferably tertiary amines such as triethylamine, tridimethyl aminophenyl phenol, benzyl dimethylamine, dimethylaniline, diethylaniline, dimethyl-p-toluidine cobalt compounds such as cobalt ethylhexanoate; vanadium octoate and/or other metal carboxylates. Accelerator systems that may be used include for example a combination of amine and metal compounds. The quantities of a free radical initiator and an optionally present accelerator system used in each case are known to a person skilled in the art.

In addition the curable polymer mixture according to the invention may, if necessary, contain processing additives such as release agents and anti-foamers; inhibitors; stabilizers such as antioxidants, photoprotectants, heat stabilizers and flame retardants; modifiers such as wetting agents, plasticizers, thickeners, thixotropic agents, impact modifiers and blowing agents and/or surface modifiers such as antistatic agents, pigments, wetting agents and dispersing agents. The additives mentioned are selected in the usual way according to the intended use.

The polymer mixture according to the invention is produced in a known manner in that the components of the mixture mentioned are combined in conventional mixing units, wherein preferably the mediator additive components are added immediately from processing and curing of the polymer mixture.

Alternatively, the mediator additive can also be mixed with the binder resin and this combination can be combined at a later point with the other components of the mixture mentioned in conventional mixing units and then cured. Alternatively, the additive used (filler component) can also be treated in advance with the mediator additive. The surface-treated additive (filler component) can then be introduced into the mixture described, wherein at this point optionally additional quantities of the mediator additive can be added. These polymer mixtures thus obtained, in the case of the duromers, can be cured in a manner known in and of itself by polymerization of the ethylenically unsaturated compounds and optionally addition of cross-linking agents. The curing process is determined by the polymer system used, the curing time, the temperature and the mass of the system to be cured. The curing can be done without additional thermal energy at room temperature as the starting temperature; in the case of this reaction control method, as a rule the previously mentioned accelerators are used. The exothermic reaction leads to a temperature increase. The progress of the curing can be followed by determining the residual monomer content in the polymeric end product that is forming. For certain applications, e.g., in the case of food contact, it is appropriate to reduce the residual monomer content, if any, to a minimum. For this purpose, photocuring is preferably performed, in which the cured polymer is kept for several additional hours at elevated temperature so that the monomers still present can polymerize. Typical post-curing conditions are temperatures of 60-100° C. over time periods of 6 to 24 hours.

Alternatively, the curing of the polymer system can also be performed under external energy input at initiation temperatures above 25° C., for example temperatures of 100 to 160° C. External energy introduction can be done in various ways, including the application of pressure. In this connection, pressing compositions such as Sheet Molding Compounds (SMC) or Bulk Molding Compounds (BMC) may be mentioned.

Other methods for producing molded parts, e.g., injection molding, reaction injection molding (RIM), or infusion molding (vacuum infusion method), may also be used.

The invention also relates to the use of the above-described composite as material for a molded article, preferably in the form of a worktop (e.g., in kitchens or for countertops or bar surfaces), molded articles for the sanitary sector (e.g., bathtubs, washbasins, toilet bowls), pipes, gutters, shafts, connectors, segmented components, slabs, non-woven cloth, bases, articles of clothing, walls, ceilings, artificial marble, frames, containers, bottles, cups, basins, decorative articles, sinks, tanks, troughs, or molded articles for reconstruction of motor vehicles, aircraft and boats.

The composites in accordance with the invention can be used in the form of composite materials for producing molded articles, both inside of buildings and outdoors, as well as underground. Corresponding molded articles are used, for example, in living areas, in offices, in stores, in the sanitary sector, in kitchens, in hair salons, in medical offices, in hospitals, in airports, in laboratories, in gastronomy or in agriculture.

Finally the invention also relates to the use of the above-described mediator additive components (A) for improving the mechanical properties of materials which have interfaces between organic polymers and inorganic materials with basic or amphoteric surfaces according to DIN EN ISO 787-9.

In the following, the present invention will be explained in further detail based on exemplified embodiments.

EXEMPLIFIED EMBODIMENTS

The following oligomers and polymers are used as raw materials in these synthesis examples:

TABLE 1

Raw materials used in the synthesis examples.

| Name | Structure |
|---|---|
| polyether A | Polyethylene glycol monoallyl ether with an average of 9 ethylene oxide repeat units |
| polyether B | Polyethylene glycol monoallyl ether with an average of 3.5 ethylene oxide repeat units |
| polyether C | Polyethylene glycol monomethacrylate with an average of 8 ethylene oxide repeat units |
| polyether D | Polypropylene glycol monoacrylate with an average of 6 propylene oxide repeat units |
| polyether E | Polyethylene glycol monoacrylate with an average of 10 ethylene oxide repeat units |
| polyether F | Polyethylene glycol monoacrylate with an average of 4.5 ethylene oxide repeat units |
| polyether G | Polyethylene glycol monoallyl ether with an average of 7.6 ethylene oxide repeat units |
| Oxetane | Monohydroxy-functional polyethylene oxide, initiated with 3-ethyl-3-(hydroxymethyl)oxacyclobutane and an average of 3.3 ethylene oxide repeat units |

Amberlyst A-21 is an anion exchanger (Rohm & Haas Company, based on the reaction product of N-methylmethanamine with chloromethylated divinylbenzene-styrene copolymer).

I Preparation of Mediator Additives

The preparation of the mediator additives can optionally take place in an organic solvent. In the information that follows, the abbreviation NMR stands for nuclear magnetic resonance spectroscopy.

The complete conversion of the acid anhydrides used in the synthesis examples was ensured by measuring the anhydride acid number (AAN) of the product. AAN is defined as the quantity of KOH in mg that corresponds to the neutralization of one carboxyl group of the anhydride in 1 g of substance. For this purpose the acid anhydride obtained is first reacted quantitatively with n-butylamine, then the excess amine is back-titrated with hydrochloric acid. In this process about 0.3 milliequivalents (based on the anhydride content) are weighed accurately into an 80 ml weighing bottle and dissolved in 50 ml acetone (water content 3%). After addition of 11.0 ml of 0.1 N butylamine solution (in acetone), the sample is held for 45 min at 50° C. To determine the anhydride number, the excess butylamine in the sample, after cooling, is back-titrated potentiometrically with 0.1 N isopropanolic HCl.

The measurement of the OH number (hydroxyl number) was performed according to DIN ISO 4629.

Mediator Additive 1:

in a round-bottom flask with reflux condenser, gas inlet, temperature sensor and KPG agitator, under a nitrogen atmosphere, 50.00 g polyether D and 10.96 g succinic anhydride as well as 0.10 g potassium carbonate and 0.10 g 2,6-di-tert-butyl-4-methylphenol and 0.10 g 4-methoxyphenol in 40.64 g 1-methoxy-2-propyl acetate are placed. [The mixture] is heated to 110° C. under agitation and agitated for 5 h at this temperature. The product obtained is a clear, slightly yellowish, low-viscosity liquid (60% solution of the active substance in 1-methoxy-2-propyl acetate).

Mediator Additive 2:

in a round-bottom flask with reflux condenser, gas inlet, temperature sensor and KPG agitator under a nitrogen atmosphere, 50.00 g polyether D and 10.75 g maleic anhydride as well as 0.10 g potassium carbonate and 0.10 g 2,6-di-tert-butyl-4-methylphenol and 0.10 g 4-methoxyphenol in 40.50 g 1-methoxy-2-propyl acetate are placed. This is heated to 120° C. under agitation and agitated for 4 h at this temperature. The product obtained is a cloudy, colorless, low-viscosity liquid (60% solution of the active ingredient in 1-methoxy-2-propyl acetate).

Mediator Additive 3:

in a round-bottom flask with reflux condenser, gas inlet, temperature sensor and KPG agitator under a nitrogen atmosphere, 70.00 g polyether A and 30.57 g trimellitic anhydride are placed. This is heated to 135° C. under agitation and agitated for 4 h at this temperature. The product obtained is a clear, brown, medium- to high-viscosity liquid.

Mediator Additive 4:

Step 1:

in a round-bottom flask with reflux condenser, temperature sensor and KPG agitator, 53.84 g polyether C, 31.46 g ε-caprolactone, 18.40 g δ-valerolactone, 0.50 g 2,6-di-tert-butyl-p-cresol and 0.10 g 4-hydroxy-2,2,6,6-tetramethylpiperidin-N-oxyl as well as 0.15 g p-toluene sulfonic acid are placed. This is heated to 100° C. under agitation and agitated for 6 h at this temperature. An additional 0.20 g p-toluene sulfonic acid is added and agitation is continued for 4 h at 100° C. After this, the lactones were almost completely converted, as was recognizable from the solids content of the sample (20 min at 150° C.) of more than 98%. The intermediate product obtained is a cloudy, yellow-brown, medium-viscosity liquid at room temperature (OH number: 73.9).

Step 2:

50.00 g of this intermediate product and 6.59 g succinic anhydride are heated in a round-bottom flask with a reflux condenser, temperature sensor and KPG agitator, with agitation, to 100° C. and agitated for 8 h at this temperature. The product is obtained as a clear, brown, medium viscosity liquid.

Mediator Additive 5:

In a round-bottom flask with a reflux condenser, gas inlet, temperature sensor and KPG agitator under a nitrogen atmosphere, 70.00 g polyether A and 14.85 g succinic anhydride are placed. This is heated to 100° C. under agitation and agitated for 7 h at this temperature. The product obtained is a clear, yellow, medium-viscosity liquid.

Mediator Additive 6:

Step 1:

In a round-bottom flask with a reflux condenser, temperature sensor, dropping funnel and KPG agitator, 122.67 g 1-methoxy-2-propyl acetate, 100.0 g hydroxyethyl methacrylate and 0.18 g 2,6-di-tert-butyl-2-cresol as well as 0.18 g hydroquinone are placed and heated under agitation. At a temperature of 50° C., 0.36 g trifluoromethane sulfonic acid is added and further heated to 80° C. At 80° C., 267.3 g 3-ethyl-3-(hydroxymethyl)oxacyclobutane are added at an addition rate of 1.2 ml/min. Agitation is continued for 3 h at 80° C. After this, the 3-ethyl-3-(hydroxymethyl) oxacyclobutane was converted quantitatively (detection by $^1$H-NMR spectroscopy). The mixture was cooled to 60° C., then 1.8 g Amberlyst A-21 (ion exchanger) is added and agitated for 1 h at 60° C. Then the ion exchanger is removed by filtration. The product obtained (OH number: 353) is milky-cloudy, medium-to-high viscosity liquid at room temperature, containing 75 wt % of the reaction product in 25% 1-methoxy-2-propyl acetate.

Step 2:

50.00 g of this cloudy solution are heated in a round-bottom flask with a reflux condenser, temperature sensor and KPG agitator together with 31.47 g succinic anhydride and 28.40 g 1-methoxy-2-propyl acetate under agitation to 100° C. and agitated for 4 h at this temperature. The product is obtained as a clear, brown, medium-viscosity, 60% solution of the reaction product in 1-methoxy-2-propyl acetate.

Mediator Additive 6a:

30.00 g [of the product] from step 1 of mediator additive 6 are heated in a round-bottom flask with reflux condenser, temperature sensor and KPG agitator together with 27.97 g phthalic anhydride, 0.10 g potassium carbonate and 23.20 g 1-methoxy-2-propyl acetate. This was heated to 100° C. under agitation and agitated for 5 h at this temperature. The product is obtained as a clear, yellow-brown, medium-viscosity, 60% solution of the reaction product in 1-methoxy-2-propyl acetate.

Mediator Additive 6b:

30.00 g [of the product] from step 1 of mediator additive 6 are heated in a round-bottom flask with reflux condenser, temperature sensor and KPG agitator together with 36.28 g trimellitic anhydride, 0.10 g potassium carbonate and 28.60 g 1-methoxy-2-propyl acetate to 120° C. under agitation and agitated for 2 h at this temperature and subsequently for 4 h at 150° C. The product is brown and highly viscous to solid at room temperature (60% solution in 1-methoxy-2-propyl acetate).

Mediator Additive 6c:

30.00 g from step 1 of mediator additive 6 are heated in a round-bottom flask with reflux condenser, temperature sensor and KPG agitator together with 18.51 g maleic anhydride, 0.10 g potassium carbonate and 6.79 g 1-methoxy-2-propyl acetate to 100° C. under agitation and agitated for 5 h at this temperature. The product is obtained as a clear, yellow, medium-to-high-viscosity solution (75 wt % of the reaction product are dissolved in 1-methoxy-2-propyl acetate).

Mediator Additive 7:

Step 1:

in a round-bottom flask with reflux condenser, temperature sensor, dropping funnel and KPG agitator, 100.00 g hydroxyethyl methacrylate and 0.34 g 2,6-di-tert-butyl-p-cresol are placed and heated under agitation. At a temperature of 40° C. 0.68 g trifluoromethane sulfonic acid are added and heated further to 80° C. At 80° C., a mixture of 178.19 g 3-ethyl-3-(hydroxymethyl) oxacyclobutane and 400.89 g oxetane X are introduced at an addition rate of 1.5 ml/min. Agitation is continued for an additional 3 h at 80° C. After this time, 3-ethyl-3-(hydroxymethyl) oxacyclobutane and oxetane X were quantitatively converted (demonstration by $^1$H-NMR spectroscopy). The mixture is cooled to 60° C., then 1.8 g Amberlyst A-21 are added and agitation is performed for 1 h at 60° C. Then the ion exchanger is removed by filtration. The product obtained (OH number: 324) is a clear, yellow, highly viscous liquid at room temperature.

Step 2:

75.00 g of this reaction product are heated in a round-bottom flask with a reflux condenser, temperature sensor and KPG agitator together with 43.30 g succinic anhydride and 78.87 g 1-methoxy-2-propyl acetate under agitation to 100 C and agitated for 4 h at this temperature. The product is obtained as a clear, brown, medium-viscosity, 60% solution of the reaction product in 1-methoxy-2-propyl acetate.

Mediator Additive 8:

50.00 g polyether G and 26.20 g succinic anhydride as well as 0.25 g potassium carbonate are placed in a round-bottom flask with reflux condenser, gas inlet, temperature sensor and KPG agitator under a nitrogen atmosphere. Under agitation the contents are heated to 110° C. and agitated for 2 h at this temperature. The product obtained is a clear, white-yellowish, medium-viscosity liquid.

Mediator Additive 9:

50.00 g polyether B and 46.06 g trimellitic anhydride and 0.19 g potassium carbonate are placed in a round-bottom flask with a reflux condenser, gas inlet, temperature sensor and KPG agitator under a nitrogen atmosphere. Under agitation the contents are heated to 140° C. and agitated for 2 h at this temperature. Then agitation is performed for an additional 2 h at 160° C. The product obtained is a brown, medium-viscosity liquid.

Mediator Additive 10:

Step 1:

in a round-bottom flask with reflux condenser, temperature sensor, dropping funnel and KPG agitator, 100.00 g hydroxymethyl methacrylate and 0.35 g 2,6-di-tert-butyl-p-cresol as well as 0.35 g hydroquinone and 234.00 g 1-methoxy-2-propyl acetate are placed and heated under agitation. At a temperature of 40° C., 0.72 g trifluoromethane sulfonic acid are added and heated further to 80° C. At 80° C., at an addition rate of 2.5 ml/min, 601.34 g oxetane X are added. Agitation is continued for 4 h at 80° C. After this the oxetane X was quantitatively converted (detected by $^1$H-NMR spectroscopy). The mixture is cooled to 60° C., then 3.27 g Amberlyst A-21 are added and agitated for 1 h at 60° C. After this the ion exchanger is removed by filtration. The intermediate product obtained (OH number: 202) is a medium-viscosity solution that is clear at room temperature (75 wt % of the reaction product are dissolved in 1-methoxy-2-propyl acetate).

Step 2:

60.00 of this intermediate product solution are heated in a round-bottom flask with a reflux condenser, temperature sensor and KPG agitator together with 21.61 g succinic anhydride, 0.16 g potassium carbonate and 7.20 g 1-methoxy-2-propyl acetate under agitation to 100° C. and agitated for 8 h at this temperature. The product is obtained as a clear, yellow-brown, medium-viscosity, 75% partial solution of the reaction product in 1-methoxy-2-propyl acetate.

Mediator Additive 11:

100.00 g polyether B and 47.94 g succinic anhydride as well as 0.30 g potassium carbonate were placed in a round-bottom flask with a reflux condenser, gas inlet, temperature sensor and KPG agitator under a nitrogen atmosphere. The mixture is heated under agitation to 100° C. and agitated for 4 h at this temperature. The product obtained is a clear, light-yellow, medium-viscosity liquid.

Mediator Additive 12:

Step 1:

In a round-bottom flask with a reflux condenser, temperature sensor, dropping funnel and KPG agitator, 8.29 g hydroxyethyl methacrylate and 0.35 g 2,6-di-tert-butyl-p-cresol along with 0.35 g hydroquinone are placed and heated under agitation. At a temperature of 40° C., 0.10 g trifluoromethane sulfonic acid is added and the mixture further heated to 80° C. At 80° C., 66.61 g oxetane X are added at a rate of 2.5 ml/min. Agitation is continued for 4 h at 80° C. After this, the oxetane X was quantitatively converted (detected by $^1$H-NMR spectroscopy). The product is cooled to 60° C., then 0.80 g Amberlyst A-21 added and agitated at 60° C. for 1 h. Then the ion exchanger is removed by filtration. The intermediate product obtained (OH number: 239) is a clear, light-yellow, medium-viscosity liquid at room temperature.

Step 2:

40.00 g of step 1 are heated in a round-bottom flask with a reflux condenser, temperature sensor and KPG agitator together with 17.04 g succinic anhydride and 38.03 g 1-methoxy-2-propyl acetate under agitation at 100° C. and agitated for 3 h at this temperature. The product is obtained as a dark brown, medium-viscosity, 60% solution of the reaction product in 1-methoxy-2-propyl acetate.

Mediator Additive 13:

Step 1:

In a round-bottom flask with reflux condenser, gas inlet, temperature sensor and KPG agitator, 63.59 g ε-caprolactone, 0.05 g 2,6-di-tert-butyl-4-methylphenol and 0.04 g p-toluene sulfonic acid are placed. The mixture is heated after agitation to 60° C. and 36.27 [g] hydroxyethyl methacrylate is added at this temperature. Agitation is continued for 6 h at 90° C. Then an additional 0.03 g dibutylethanolamine is added to neutralize the p-toluene sulfonic acid. The product obtained is a clear, colorless, medium-viscosity liquid (OH number: 157).

Step 2:

40.00 g of this intermediate product of step 1 are placed in a round-bottom flask with a reflux condenser, temperature sensor, dropping funnel and KPG agitator along with 0.16 g 2,6-di-tert-butyl-p-cresol and 0.16 g 4-methoxyphenol and 26.32 g 1-methoxy-2-propyl acetate and heated under agitation. At a temperature of 40° C., 0.16 g trifluoromethane sulfonic acid are added and further heated to 80° C. At 80° C., 38.96 g 3-ethyl-3-methyloxetane is introduced at an addition rate of 1.5 ml/min. Agitation is continued for 4 at 80° C. After this the 3-ethyl-3-methyloxetane was quantitatively converted (detection by 1H-NMR spectroscopy). The solution is cooled to 60° C., then 0.80 Amberlyst A-21 is added and agitation is performed for 1 h at 60° C. Then the ion exchanger is removed by filtration. The intermediate product obtained (OH number: 218) is a cloudy, yellowish, high-viscosity solution at room temperature (75 wt % of the reaction product is dissolved in 1-methoxy-2-propyl acetate).

Step 3:

50.00 g of the solution from step 2 are heated in a round-bottom flask with a reflux condenser, gas inlet, temperature sensor and KPG agitator together with 19.43 g succinic anhydride, 0.10 g potassium carbonate and 22.54 g 1-methoxy-2-propyl acetate to 100° C. and agitated for 8 h at this temperature. The product obtained is a slightly cloudy, yellowish, medium-viscosity liquid (60% solution of the active isubstance in 1-methoxy-2-propyl acetate).

Mediator Additive 14:

Step 1:

In a round-bottom flask with reflux condenser, temperature sensor, dropping funnel and KPG agitator, 50.00 g hydroxybutyl acrylate and 0.34 g 2,6-di-tert-butyl-p-cresol, 0.34 g 4-methoxyphenol, 0.05 g 4-hydroxy-2,2,6,6-tetramethylpiperidine-n-oxyl and 56.91 g 1-methoxy-2-propyl acetate are placed and heated under agitation. At a temperature of 40° C., 0.34 g trifluoromethane sulfonic acid are added and further heated to 80° C. At 80° C., 120.76 g 3-ethyl-3-methyloxetane are added at an addition rate of 0.7 ml/min. Agitation is continued for an additional 3 h at 80° C. After this, the 3-ethyl-3-methyloxetane was quantitatively converted (detected by $^1$H-NMR spectroscopy). The mixture is cooled to 60° C., then 1.7 g Amberlyst A-21 added and agitation continued for 1 h at 60° C. Then the ion exchanger is removed by filtration. The intermediate product obtained (OH number: 341) is a light yellowish, highly viscous solution, cloudy at room temperature (75 wt % of the reaction product are dissolved in 1-methoxy-2-propyl acetate).

Step 2:

In a round-bottom flask with reflux condenser, gas inlet, temperature sensor and KPG agitator, 60.00 g of the solution of step 1 together with 36.47 g succinic anhydride, 0.13 g potassium carbonate and 29.41 g 1-methoxy-2-propyl acetate are heated to 100° C. and agitated for 8 h at this temperature. The product obtained is a clear, yellowish, medium- to high-viscosity liquid (60% solution of the effective substance in 1-methoxy-2-propyl acetate).

Mediator Additive 15:

Step 1:

in a round-bottom flask with reflux condenser, temperature sensor, dropping funnel and KPG agitator, 30.00 g hydroxyethyl methacrylate and 0.71 g 2,6-di-tert-butyl-p-cresol, 0.71 g 4-methoxyphenol and 189.27 g 1-methoxy-2-propyl acetate are placed and heated under agitation. At a temperature of 40° C., 0.71 g trifluoromethane sulfonic acid are added and further heated to 80° C. At 80° C. and an addition rate of 1.0 ml/min, a mixture of 133.63 g 3-ethyl-3-methyloloxetane and 120.27 g Oxetane X is added. Agitation is continued for an additional 3 h at 80° C. After this, 3-Ethyl-3-methyloloxetane and Oxetane X were quantitatively converted (demonstrated by $^1$H-NMR spectroscopy). The mixture is cooled to 60° C. ab, then 3.55 g Amberlyst A-21 added and agitated for 1 h at 60° C. Then the ion exchanger is removed by filtration. The intermediate product obtained (OH number: 225) is a slightly cloudy, yellowish, medium-viscosity (60 wt % of the reaction product are dissolved in 1-methoxy-2-propyl acetate).

Step 2:

60.00 g of the solution of step 1 are heated to 100° C. in a round-bottom flask with reflux condenser, gas inlet, temperature sensor and KPG agitator, together with 24.07 g succinic anhydride, 0.10 g potassium carbonate and 13.75 g 1-methoxy-2-propyl acetate and agitated for 8 h at this temperature. The product obtained is a clear, yellowish, medium-viscosity liquid (60% solution of the effective substance in 1-methoxy-2-propyl acetate).

Mediator Additive 16:

Step 1:

in a round-bottom flask with reflux condenser, temperature sensor, dropping funnel and KPG agitator, 30.00 g hydroxyethyl methacrylate and 0.43 g 2,6-Di-tert-butyl-p-cresol, 0.43 g 4-methoxyphenol and 72.36 g 1-methoxy-2-propyl acetate are placed and heated under agitation. At a temperature of 40° C., 0.43 g trifluoromethane sulfonic acid is added and further heated to 80° C. At 80° C., 187.1 g 3-ethyl-3-methyloloxetane are introduced at an addition rate of 1.0 ml/min. Agitation is continued for an additional 3 h at 80° C. After this, the 3-ethyl-3-methyloloxetane was quantitatively converted (detection by $^1$H-NMR spectroscopy). The mixture is cooled to 60° C., then 2.15 g Amberlyst A-21 added and agitated for 1 h at 60° C. Then the ion exchanger is removed by filtration. The intermediate product obtained (OH number: 353) is a cloudy, light yellowish, high-viscosity solution at room temperature (75 wt % of the reaction product are dissolved in 1-methoxy-2-propyl acetate).

Step 2:

40.00 g of the solution of step 1 are heated in a round-bottom flask with reflux condenser, gas inlet, temperature sensor and KPG agitator, together with 25.7 g succinic anhydride, 0.10 g potassium carbonate and 25.11 g 1-methoxy-2-propyl acetate to 100° C. and heated 4 h at this temperature. Then agitation is continued for 2 h at 110° C. The product obtained is a slightly cloudy, yellowish, medium-viscosity liquid (60% solution of the effective substance in 1-methoxy-2-propyl acetate).

Mediator Additive 17:

In a round-bottom flask with reflux condenser, gas inlet, temperature sensor and KPG agitator, 50.00 g polyether C, 13.28 g succinic anhydride, 0.10 g potassium carbonate, 0.10 g 2,6-Di-tert-butyl-4-methylphenol and 0.10 g 4-methoxyphenol in 42.19 g 1-methoxy-2-propyl acetate are placed under a nitrogen atmosphere. Then the mixture is heated to 100° C. with agitation and agitated for 6 h at this temperature. The product obtained is a slightly cloudy, colorless, low-viscosity liquid (60% solution of the effective substance in 1-methoxy-2-propyl acetate).

Mediator Additive 18:

In a round-bottom flask with reflux condenser, gas inlet, temperature sensor and KPG agitator, 50.00 g polyether C, 13.02 g maleic anhydride, 0.10 g potassium carbonate, 0.10 g 2,6-di-tert-butyl-4-methylphenol and 0.10 g 4-methoxyphenol in 42.01 g 1-methoxy-2-propyl acetate are placed under a nitrogen atmosphere. The mixture is heated under agitation to 120° C. and agitated for 6 h at this temperature. The product obtained is a cloudy, yellowish, low-viscosity liquid (60% solution of the effective substance in 1-methoxy-2-propyl acetate).

Mediator Additive 19:

In a round-bottom flask with reflux condenser, gas inlet, temperature sensor and KPG agitator, 50.00 g polyether C, 19.77 g phthalic anhydride, 0.11 g potassium carbonate, 0.11 g 2,6-di-tert-butyl-4-methylphenol and 0.11 g 4-methoxyphenol in 46.45 g 1-methoxy-2-propyl acetate are placed under a nitrogen atmosphere. The mixture is heated under agitation to 120° C. and agitated for 6 h at this temperature. The product obtained is a cloudy, colorless, low-viscosity liquid (60% solution of the effective substance in 1-methoxy-2-propyl acetate).

Mediator Additive 19:

In a round-bottom flask with reflux condenser, gas inlet, temperature sensor and KPG agitator, 50.00 g polyether C, 19.77 g phthalic anhydride, 0.11 g potassium carbonate, 0.11 g 2,6-di-tert-butyl-4-methylphenol and 0.11 g 4-methoxyphenol in 46.45 g 1-methoxy-2-propyl acetate are placed under a nitrogen atmosphere. The mixture is heated under agitation to 120° C. and agitated for 6 h at this temperature. The product obtained is a cloudy, colorless, low-viscosity liquid (60% solution of the effective substance in 1-methoxy-2-propyl acetate).

Mediator Additive 20:

in a round-bottom flask with reflux condenser, gas inlet, temperature sensor and KPG agitator, 50.00 g polyether E, 8.66 g succinic anhydride, 0.10 g potassium carbonate, 0.10 g 2,6-ii-tert-butyl-4-methylphenol and 0.10 g 4-methoxyphenol in 39.14 g 1-methoxy-2-propyl acetate are placed under a nitrogen atmosphere. The mixture is heated under agitation to 100° C. and agitated for 6 h at this temperature. The product obtained is a clear, colorless, low-viscosity liquid (60% solution of the effective substance in 1-methoxy-2-propyl acetate).

Mediator Additive 21:

in a round-bottom flask with reflux condenser, gas inlet, temperature sensor and KPG agitator, 50.00 g polyether E, 8.49 g maleic anhydride, 0.10 g potassium carbonate, 0.10 g 2,6-di-tert-butyl-4-methylphenol and 0.10 g 4-methoxyphenol in 38.99 g 1-methoxy-2-propyl acetate are placed under a nitrogen atmosphere. The mixture is heated under agitation to 120° C. and agitated for 6 h at this temperature. The product obtained is a clear, slightly yellowish, low-viscosity liquid (60% solution of the effective substance in 1-methoxy-2-propyl acetate).

Mediator Additive 22:

In a round-bottom flask with reflux condenser, gas inlet, temperature sensor and KPG agitator, 50.00 g polyether E, 12.83 g phthalic anhydride, 0.10 g potassium carbonate, 0.10 g 2,6-di-tert-butyl-4-methylphenol and 0.10 g 4-methoxyphenol in 38.99 g 1-methoxy-2-propyl acetate are placed under a nitrogen atmosphere. The mixture is heated under agitation to 120° C. and agitated for 6 h at this temperature. The product obtained is a clear, slightly yellowish, low-viscosity liquid (60% solution of the effective substance in 1-methoxy-2-propyl acetate).

Mediator Additive 23:

Step 1:

In a round-bottom flask with reflux condenser, gas inlet, temperature sensor and KPG agitator, 50.00 g polyethylene glycol-200 and 149.30 g 1-methoxy-2-propyl acetate are placed under a nitrogen atmosphere. This is heated under agitation to 40° C. and 0.23 g trifluoromethane sulfonic acid are added. The mixture is heated to 80° C. and under agitation, 174.00 g 3-ethyl-3-methyloloxetane are added at a rate of 1.0 mL/min. After addition is complete, agitation is continued for an additional 4 h at 80° C. (complete conversion of 3-ethyl-3-methyloloxetane, detection by $^1$H-NMR spectroscopy). The mixture is cooled to 60° C., then 1.12 g Amberlyst A-21 are added, followed by agitation for 1 h at 60° C. Then the ion exchanger is removed by filtration. The intermediate product obtained (OH number: 306) is a cloudy, slightly yellowish, viscous solution at room temperature (60 wt % of the reaction product are dissolved in 1-methoxy-2-propyl acetate).

Step 2:

In a round-bottom flask with reflux condenser, gas inlet, temperature sensor and KPG agitator, 50.00 g of the product from step 1, 6.69 g maleic anhydride, 0.07 g $K_2CO_3$ and 5.94 g 1-methoxy-2-propyl acetate are placed under a nitrogen atmosphere. The mixture is heated under agitation to 100° C. and agitation continued for 4 h at this temperature (product: cloudy, yellowish, medium-viscosity liquid, 60% partial solution of the reaction product in 1-methoxy-2-propyl acetate, OH number=123).

Step 3:

In a round-bottom flask with reflux condenser, gas inlet, temperature sensor and KPG agitator, 39.00 g of the product from step 1, 8.55 g succinic anhydride, 0.05 g $K_2CO_3$ and 5.70 g 1-methoxy-2-propyl acetate are placed under a nitrogen atmosphere. The mixture is heated under agitation to 120° C. and further agitated for 1 h at this temperature; then agitation is continued for an additional 6 h at 100° C. (product: clear, yellowish, medium-viscosity liquid, 60% partial solution of the reaction product in 1-methoxy-2-propyl acetate).

Mediator Additive 24:

In a round-bottom flask with reflux condenser, gas inlet, temperature sensor and KPG agitator, 50.00 g of the product from step 1 of mediator additive 23, 26.75 g maleic anhydride, 0.10 g $K_2CO_3$ and 19.33 g 1-methoxy-2-propyl acetate are placed under a nitrogen atmosphere. The mixture is heated under agitation to 100° C. and further agitated for 4 h at this temperature. Then another 0.10 g $K_2CO_3$ are added and agitated for an additional 3 h at 100° C. (product: clear, brownish, medium- to high-viscosity liquid, 60% partial solution of the reaction product in 1-methoxy-2-propyl acetate).

Mediator Additive 25:

In a round-bottom flask with reflux condenser, gas inlet, temperature sensor and KPG agitator, under a nitrogen atmosphere 50.00 g polyether F and 18.18 g succinic anhydride and 0.11 g potassium carbonate, 0.11 g 2,6-di-tert-butyl-4-methylphenol and 0.11 g 4-methoxyphenol in 45.45 g 1-methoxy-2-propyl acetate are placed under a nitrogen atmosphere. The mixture is heated under agitation to 110° C. and further agitated for 6 h at this temperature. The product obtained is a clear, colorless, low-viscosity liquid (60% solution of the effective substance in 1-methoxy-2-propyl acetate).

Mediator Additive 26:

In a round-bottom flask with reflux condenser, gas inlet, temperature sensor and KPG agitator, 50.00 g polyether F and 17.83 g maleic anhydride and 0.11 g potassium carbonate, 0.11 g 2,6-di-tert-butyl-4-methylphenol and 0.11 g 4-methoxyphenol in 45.45 g 1-methoxy-2-propyl acetate are placed under a nitrogen atmosphere. The mixture is heated under agitation to 120° C. and further agitated for 6 h at this temperature. The product obtained is a clear, yellowish, low-viscosity liquid (60% solution of the effective substance in 1-methoxy-2-propyl acetate).

Mediator Additive 27:

In a round-bottom flask with reflux condenser, gas inlet, temperature sensor and KPG agitator, under a nitrogen atmosphere 50.00 g polyether F and 26.93 g phthalic anhydride and 0.13 g potassium carbonate, 0.13 g 2,6-di-tert-butyl-4-methylphenol and 0.13 g 4-methoxyphenol in 51.28 g 1-methoxy-2-propyl acetate are placed under a nitrogen atmosphere. The mixture is heated under agitation to 110° C. and further agitated for 6 h at this temperature. The product obtained is a clear, slightly yellowish, low-viscosity liquid (60% solution of the effective substance in 1-methoxy-2-propyl acetate).

Mediator Additive 28:

10.00 g of the solution from step 1 of mediator additive 16, together with 24.68 g maleic anhydride, 0.10 g potassium carbonate and 24.79 g 1-methoxy-2-propyl acetate are heated to 100° C. in a round-bottom flask with reflux condenser, gas inlet, temperature sensor and KPG agitator and further agitated for 4 h at this temperature. Then it is agitated for an additional 2 h at 110° C. The product obtained is a clear, yellowish, medium-viscosity liquid (60% solution of the effective substance in 1-methoxy-2-propyl acetate).

Mediator Additive 29:

40.00 g of the solution from step 1 of mediator additive 16, together with 37.29 g phthalic anhydride, 0.11 g potassium carbonate and 33.20 g 1-methoxy-2-propyl acetate are heated to 120° C. in a round-bottom flask with reflux condenser, gas inlet, temperature sensor and KPG agitator and further agitated for 6 h at this temperature. The product obtained is a clear, yellowish, medium-viscosity liquid (60% solution of the effective substance in 1-methoxy-2-propyl acetate).

Mediator Additive 30:

60.00 g of the solution from step 1 of mediator additive 15 are heated to 100° C. in a round-bottom flask with reflux condenser, gas inlet, temperature sensor and KPG agitator, together with 23.60 g maleic anhydride, 0.0 g potassium carbonate and 13.43 g 1-methoxy-2-propyl acetate and further agitated for 8 h at this temperature. The product obtained is a clear, yellowish, medium-viscosity liquid (60% solution of the effective substance in 1-methoxy-2-propyl acetate).

Mediator Additive 31:

50.00 g of the solution from step 1 of mediator additive 15 are heated to 120° C. in a round-bottom flask with reflux condenser, gas inlet, temperature sensor and KPG agitator, together with 29.71 g phthalic anhydride, 0.10 g potassium carbonate and 17.89 g 1-methoxy-2-propyl acetate and further agitated for 6 h at this temperature. The product obtained is a clear, yellowish, medium-viscosity liquid (60% solution of the effective substance in 1-methoxy-2-propyl acetate).

Mediator Additive 32:

60.00 g of the solution from step 1 of mediator additive 14 are heated to 100° C. in a round-bottom flask with reflux condenser, gas inlet, temperature sensor and KPG agitator, together with 35.76 g maleic anhydride, 0.13 g potassium carbonate and 28.94 g 1-methoxy-2-propyl acetate and further agitated for 8 h at this temperature. The product obtained is a clear, yellowish, medium- to high-viscosity liquid (60% solution of the effective substance in 1-methoxy-2-propyl acetate).

Mediator Additive 33:

50.00 g of the solution from step 1 of mediator additive 14 are heated to 120° C. in a round-bottom flask with reflux condenser, gas inlet, temperature sensor and KPG agitator together with 45.02 g phthalic anhydride, 0.13 g potassium carbonate and 34.26 g 1-methoxy-2-propyl acetate and further agitated for 8 h at this temperature. The product obtained is a clear, yellowish, medium-viscosity liquid (60% solution of the effective substance in 1-methoxy-2-propyl acetate).

Mediator Additive 34:

50.00 g of the solution from step 2 of mediator additive 13 are heated to 120° C. in a round-bottom flask with reflux condenser, gas inlet, temperature sensor and KPG agitator, together with 19.05 g maleic anhydride, 0.10 g potassium carbonate and 22.29 g 1-methoxy-2-propyl acetate and further agitated for 8 h at this temperature. The product obtained is a clear, yellowish, medium-viscosity liquid (60% solution of the effective substance in 1-methoxy-2-propyl acetate).

Mediator Additive 35:

50.00 g of the solution from step 2 of mediator additive 13 are heated 120° C. in a round-bottom flask with reflux condenser, gas inlet, temperature sensor and KPG agitator, together with 28.82 g phthalic anhydride, 0.11 g potassium carbonate and 28.79 g 1-methoxy-2-propyl acetate and further agitated for 8 h at this temperature. The product obtained is a clear, yellowish, medium-viscosity liquid (60% solution of the effective substance in 1-methoxy-2-propyl acetate).

Mediator Additive 36:

Step 1:

In a round-bottom flask with reflux condenser, gas inlet, temperature sensor and KPG agitator, under a nitrogen atmosphere, 75.00 g polyether B and 0.06 g 2,6-di-tert-butyl-4-methylphenol are placed under a nitrogen atmosphere. Under agitation this is heated [to] 40° C. and 0.13 g trifluoromethane sulfonic acid is added. The mixture is heated to 80° C. and under agitation, 41.72 g 3-ethyl-3-methyloloxetane is added at a rate of 0.5 mL/min and after the addition, the agitation is continued for another 3 h at 80° C. (complete conversion of 3-ethyl-3-methyloloxetane, detected by $^1$H-NMR spectroscopy). The mixture is cooled to 60° C., then 0.65 g Amberlyst A-21 is added and agitated for 1 h at 60° C. Then the ion exchanger is removed by filtration. The intermediate product obtained (OH number: 353) is a cloudy, colorless, medium-viscosity liquid at room temperature.

Step 2:

In a round-bottom flask with reflux condenser, gas inlet, temperature sensor and KPG agitator, under a nitrogen atmosphere 50.00 g of the product from step 1, 31.46 g succinic anhydride and 0.16 g $K_2CO_3$ are placed under a nitrogen atmosphere. The mixture is heated under agitation to 100° C. and further agitated for 4 h at this temperature (product: clear, yellowish, medium-viscosity liquid, 100%).

Mediator Additive 37:

Step 1:

In a round-bottom flask with reflux condenser, gas inlet, temperature sensor and KPG agitator, under a nitrogen atmosphere 30.00 g polyether B and 0.06 g 2,6-di-tert-butyl-4-methylphenol are placed under a nitrogen atmosphere. [It is] heated [to] 40° C. and 0.13 g trifluoromethane sulfonic acid is added. The mixture is heated to 80° C. and under agitation a mixture of 25.02 g 3-ethyl-3-methyloloxetane and 56.30 g Oxetane X at a rate von 1.0 mL/min and after addition is complete, agitated for an additional 4 h at 80° C. (complete conversion of 3-ethyl-3-methyloloxetane and Oxetane X, detection by $^1$H-NMR spectroscopy). The mixture is cooled to 60° C., then 0.65 g Amberlyst A-21 is added and the mixture agitated for 1 h at 60° C. Then the ion exchanger is removed by filtration. The intermediate product obtained (OH number: 302) is a slightly cloudy, colorless, medium-viscosity liquid at room temperature.

Step 2:

In a round-bottom flask with reflux condenser, gas inlet, temperature sensor and KPG agitator, under a nitrogen atmosphere 50.00 g of the product from step 1, 26.91 g succinic anhydride and 0.16 g $K_2CO_3$ are placed under a nitrogen atmosphere. The mixture is heated under agitation to 100° C. and further agitated for 4 h at this temperature (product: clear, yellowish, medium-viscosity liquid, 100%).

Mediator Additive 38:

In a round-bottom flask with reflux condenser, gas inlet, temperature sensor and KPG agitator, 45.16 g polyether D, 14.66 g phthalic anhydride, 0.10 g potassium carbonate, 0.10 g 2,6-di-tert-butyl-4-methylphenol and 0.10 g 4-methoxyphenol in 39.88 g 1-methoxy-2-propyl acetate are placed under a nitrogen atmosphere. The mixture is heated under agitation to 120° C. and further agitated for 4 h at this temperature. The product obtained is a clear, low-viscosity liquid (60% solution of the effective substance in 1-methoxy-2-propyl acetate).

Mediator Additive 39:

Step 1:

In a round-bottom flask with reflux condenser, gas inlet, temperature sensor and KPG agitator, under a nitrogen atmosphere 68.42 g of step 1 from the production of mediator additive 23, 7.20 g methacrylic acid anhydride, 0.10 g $K_2CO_3$, 0.16 g 2,6-di-tert-butyl-4-methylphenol, 0.16 g 4-methoxyphenol, 0.05 g 4-hydroxy-2,2,6,6-tetramethyl-piperidine-n-oxyl and 23.34 g 1-methoxy-2-propyl acetate are placed under a nitrogen atmosphere. The mixture is heated under agitation to 120° C. and further agitated for 4 h at this temperature; after this time, the anhydride is no longer detectable in the reaction mixture. Then 0.55 g titanium diisopropoxy-bis(acetylacetonate) are added and the mixture agitated for 10 h at 160° C. Product: clear-slightly cloudy, brown, high-viscosity liquid (72% partial solution in 1-methoxy-2-propyl acetate, OH number: 219).

Step 2:

In a round-bottom flask with reflux condenser, gas inlet, temperature sensor and KPG agitator, 53.97 g of the product from step 1, 21.07 g succinic anhydride and 0.10 g potassium carbonate in 24.86 g 1-methoxy-2-propyl acetate are placed under a nitrogen atmosphere. The mixture is heated under agitation to 120° C. and further agitated for 4 h at this temperature. The product obtained is a clear, brown, medium-viscosity liquid (60% solution of the effective substance in 1-methoxy-2-propyl acetate).
Mediator Additive 40:

in a round-bottom flask with reflux condenser, gas inlet, temperature sensor and KPG agitator, under a nitrogen atmosphere 50.00 g polyether F and 16.36 g succinic anhydride and 0.11 g potassium carbonate, 0.11 g 2,6-Di-tert-butyl-4-methylphenol and 0.11 g 4-methoxyphenol in 44.46 g 1-methoxy-2-propyl acetate are placed under a nitrogen atmosphere. The mixture is heated under agitation to 110° C. and further agitated for 5 h at this temperature. The product obtained is a clear, colorless, low-viscosity liquid (60% solution of the effective substance in 1-methoxy-2-propyl acetate).
Mediator Additive 41:

in a round-bottom flask with reflux condenser, gas inlet, temperature sensor and KPG agitator, under a nitrogen atmosphere 50.00 g polyether F and 13.64 g succinic anhydride and 0.11 g potassium carbonate, 0.11 g 2,6-Di-tert-butyl-4-methylphenol and 0.11 g 4-methoxyphenol in 42.65 g 1-methoxy-2-propyl acetate are placed under a nitrogen atmosphere. The mixture is heated under agitation to 110° C. and further agitated for 5 h at this temperature. The product obtained is a clear, colorless, low-viscosity liquid (60% solution of the effective substance in 1-methoxy-2-propyl acetate).
Mediator Additive 42:

In a round-bottom flask with reflux condenser, gas inlet, temperature sensor and KPG agitator, under a nitrogen atmosphere 50.00 g polyether F, 9.09 g succinic anhydride, 8.91 g maleic anhydride and 0.11 g potassium carbonate, 0.11 g 2,6-Di-tert-butyl-4-methylphenol and 0.11 g 4-methoxyphenol in 45.45 g 1-methoxy-2-propyl acetate are placed under a nitrogen atmosphere. The mixture is heated under agitation to 110° C. and further agitated for 5 h at this temperature. The product obtained is a clear, colorless, low-viscosity liquid (60% solution of the effective substance in 1-methoxy-2-propyl acetate).

Comparison Example VG-1

(according to *British Polymer J.* 1979, 11, 199) 3-Methacryloyloxypropyltrimethoxysilane Comparison Example VG-2a (low-molecular-weight comparison product with carboxylic acid group and methacrylate group)
Methacrylic Acid Comparison Example VG-2b (low-molecular-weight comparison product with carboxylic acid group and acrylate group)
Acrylic Acid Comparison Example VG-3

(according to J. Material Research 2009, 24, 1553)
Mono-2-(methacryloxy)ethyl succinate, 60% partially dissolved in 1-methoxy-2-propyl acetate Comparison Example VG-4

(according to WO 2008/049840)
20.00 g hydroxyethyl methacrylate, 0.10 g 2,6-Di-tert-butyl-p-cresol, 0.10 g 4-methoxyphenol, 45.47 g dodecyl succinate anhydride and 0.14 g potassium carbonate are placed in a round-bottom flask with reflux condenser, temperature sensor and KPG agitator under a nitrogen atmosphere. The mixture is heated under agitation to 100° C. and further agitated for 6 h at this temperature. The product obtained is a clear, brown, viscous liquid.

Comparison Example VG-5a (according to WO 2008/049840)
43.69 g 1-methoxy-2-propyl acetate, 50.00 g SMA-resin 2000 (styrene-maleic anhydride copolymer, available from Cray Valley) and 0.14 g 2,6-di-tert-butyl-p-cresol are placed in a round-bottom flask with reflux condenser, temperature sensor and KPG agitator under a nitrogen atmosphere. The mixture is heated under agitation to 120° C., and after 30 min the SMA resin has dissolved completely. Then 15.54 g allyl glycol are dropped in within 20 min and then agitated for an additional 2 h at 120° C. and 5 h at 140° C. The product obtained is a clear, brown, medium-viscosity liquid (60% solution of the effective substance in 1-methoxy-2-propyl acetate).

Comparison Example VG-5b (according to WO 2008/049840)
68.91 g 1-methoxy-2-propyl acetate, 50.00 g SMA resin 1000 (styrene-maleic anhydride copolymer, available from Cray Valley), 18.91 g Allyl glycol, 0.07 g p-toluene sulfonic acid and 0.07 g 2,6-Di-tert-butyl-p-cresol are placed in a round-bottom flask with reflux condenser, temperature sensor and KPG agitator under a nitrogen atmosphere. The mixture is agitated for 6 h at 140° C. The product obtained is a clear, brown, medium-viscosity liquid (60% solution of the effective substance in 1-methoxy-2-propyl acetate).

Comparison Example VG-5c (according to WO 2008/049840)
41.91 g n-butyl acetate, 30.00 g SMA resin 2000 (styrene-maleic anhydride copolymer, available from Cray Valley), 0.08 g dodecyl benzene sulfonic acid and 0.08 g 2,6-di-tert-butyl-p-cresol are placed under a nitrogen atmosphere in a round-bottom flask with reflux condenser, temperature sensor and KPG agitator. The mixture is heated under agitation to 100° C., and after 10 min the SMA resin dissolved completely. Then 11.91 g hydroxyethyl methacrylate are dropped in within 15 min and then agitated for an additional 6 h at 100° C. The product obtained is a clear, yellow, medium-viscosity liquid (50% solution of the effective substance in n-butyl acetate).

Comparison Example VG-5d (according to WO 2008/049840)
44.48 g n-butyl acetate, 30.00 g SMA resin 1000 (styrene-maleic anhydride copolymer, available from Cray Valley), 0.08 g dodecyl benzene sulfonic acid and 0.08 g 2,6-di-tert-butyl-p-cresol are placed under a nitrogen atmosphere in a round-bottom flask with reflux condenser, temperature sensor and KPG agitator. The mixture is heated under agitation to 100° C. and after 10 min the SMA resin has dissolved completely. Then 14.48 g hydroxyethyl methacrylate are dropped in within 15 min and then agitated for an additional 6 h at 100° C. The product obtained is a clear, yellow, medium-viscosity liquid (50% solution of the effective substance in n-butyl acetate).

II Use of the Mediator Additives

In the following, "Parts" always means parts by weight.

TABLE 2

Raw materials used in the exemplified embodiments.

| Name | Manufacturer | Description |
|---|---|---|
| Degalan LP 51/03 | Evonik | PMMA bead polymer based on methyl methacrylate ($T_g$ = 121° C.) |
| MMA | BASF | Methyl methacrylate |
| EGDMA | Merck | Ethylene glycol dimethacrylate |
| Pergaquick A 150 | Pergan GmbH | N-N-Bis(2-hydroxyethyl)-p-toluidine |
| BYK-A 515 | BYK-Chemie GmbH | Defoamer; solution of foam-breaking polymers, silicone-free |
| Peroxan BP powder 50W | Pergan GmbH | Dibenzoyl peroxide, 50% in dicyclohexyl adipate |
| Alcan Onyx Premier OP-25 | Alcan Chemicals Ltd. | Pure white, crystalline, free-flowing aluminum trihydroxide, mean particle size according to data sheet: 25 μm |
| Alcan WP-31 Onyx Premier | Alcan Chemicals Ltd. | Free-flowing aluminum trihydroxide, mean particle size according to data sheet: 35-45 μm |
| Martinal ON-4608 | Albermarle Corp. | Aluminum trihydroxide, particle size according to data sheet: d10 μm: 1.0-3.0/d50 μm: 7.0-10.0/d90 μm: 16.0-24.0 |
| Carolith 0.2-0.5 NP | Omya GmbH, Köln | White calcium carbonate granules, produced from natural marble; pass-through at corresponding screen opening size: 5% at 0.1 mm/94% at 0.5 mm |
| Carolith 0.5-1.0 NP | Omya GmbH, Cologne | White calcium carbonate granules, produced from natural marble, pass-through at corresponding screen opening size: 25% at 0.5 mm/97% at 1.0 mm |
| Durcal 10 | Omya GmbH, Cologne | Fine, white calcium carbonate of high chemical purity, mean particle diameter (D50%): 9 μm |

(IIa) Production of Test Pieces in an Aluminum Hydroxide-Filled Acrylate Resin System First the acrylate base resin ("acrylate syrup") is prepared. For this purpose, 80 parts MMA are mixed with 20 parts Degalan LP 51/03 (PMMA granulate) and dissolved; the dissolution process is performed by continuously moving the MMA/PMMA mixture for 48 hours in a closed 2.5 L brown glass bottle on a roller bench (round-bottom mill system, H. Welter Co.).

Later this syrup (i) is mixed with the other components (ii to vi) listed in Tab. 3:

TABLE 3

Composition of the resin/filler mixture used in ATH-filled systems.

| I | Acrylate syrup | 100 |
|---|---|---|
| ii | EGDMA | 3 |
| iii | BYK-A 515 | 0.5 |
| iv | Pergaquick A 150 | 0.5 |
| v | Peroxan BP Powder 50 W | 1.5 |
| vi | Aluminum hydroxide (ATH) | 150 |

Measurement of the Bending Strength
(Quantitative fractions according to Table 3)

Example (No Mediator Additive, Comparison Example)

The syrup (component (i)) is placed under a nitrogen atmosphere and the components (ii) to (v) mentioned in Tab. 3 are weighed in according to the sequence of the formula, then mixed with a spatula. Then the ATH (component (vi)) is weighed in, mixed in manually, and then agitated for ½ minute at 930 RPM with a dissolver (Model Pendraulik, type TD-100, chopper disk 40 mm).

This filler/resin mixture is cast into a flat mold made of melamine resin (dimensions: 107 mm×205 mm×15 mm). Curing to form a slab is performed at room temperature for 1 hour. Then the slab is held for 24 hours at 80° C. After complete curing, test pieces are cut from the slab with a diamond saw; these pieces comply with the test standard DIN EN ISO 178 (dimension of the test piece: 80 mm×15 mm, thickness 6 mm). The bending strength is measured with a Universal Test Machine Model 1465 from the Zwick company.

Example (with Mediator Additive)

Exactly the same procedure was carried out as in the previously described production of the test piece without the mediator additive. In addition, the amounts of the mediator additives presented in Tables 4, 5 and 6 of the relevant mixture components are added to the dissolver before homogenization of the mixture components.

System I
ATH Type: Alcan WP-31

TABLE 4

Determination of the bending strength of test pieces with the filler Alcan WP-31.

| Additive | Quantity added in %* | Bending strength in N/mm$^2$ | Improvement vs. blank |
|---|---|---|---|
| — | — | 44 | — |
| 3 | 1.00 | 59 | +34% |
| 4 | 1.00 | 60 | +36% |
| 5 | 1.00 | 58 | +32% |
| 6 | 0.60 (1.00) | 64 | +45% |
| 6 | 0.45 (0.75) | 63 | +44% |
| 6 | 0.30 (0.50) | 62 | +41% |
| 6 | 0.15 (0.25) | 61 | +39% |
| 6a | 0.60 (1.00) | 55 | +25% |
| 7 | 0.60 (1.00) | 56 | +27% |
| 25 | 1.00 | 60 | +36% |
| VG-5a | 0.60 (1.00) | 45 | +2% |
| VG-5b | 0.60 (1.00) | 48 | +9% |
| VG-5c | 0.50 (1.00) | 48 | +9% |
| VG-5d | 0.50 (1.00) | 44 | ±0 |

*calculated in wt % of the polymeric mediator additive, based on the weight of the aluminum hydroxide used (in parentheses: Quantity of mediator additive added - partial solution from the reaction batch, if the additive was not produced in 100% form)

It is apparent form the results that the bending strength of the cured test piece is significantly increased by addition of the mediator additives in the quantities described. The comparison with the values achieved by addition of the comparison products VG-5a, -5b, -5c and -5d also shows that the improvement in bending strength is greater than with the relevant known mediator additives. The concentration series conducted with the mediator additive 6 also shows that a distinct improvement in the bending strength is achieved even at relatively low addition rates of the mediator additives.

System II
ATH Type: Alcan OP-25

TABLE 5

Determination of the bending strength of test pieces with the filler Alcan OP-25.

| Additive | Quantity added in %* | Bending strength in N/mm² | Improvement vs. blank |
|---|---|---|---|
| — | — | 50 | — |
| 5 | 1.00 | 60 | +20% |
| 6 | 0.60 (1.00) | 72 | +44% |
| 6b | 0.60 (1.00) | 78 | +56% |
| 6c | 0.75 (1.00) | 71 | +42% |
| 8 | 1.00 | 56 | +12% |
| 9 | 1.00 | 64 | +28% |
| 10 | 0.75 (1.00) | 62 | +24% |
| 11 | 1.00 | 60 | +20% |
| 12 | 0.60 (1.00) | 61 | +22% |
| 13 | 0.60 (1.00) | 75 | +50% |
| 14 | 0.60 (1.00) | 80 | +60% |
| 15 | 0.60 (1.00) | 75 | +50% |
| 16 | 0.60 (1.00) | 82 | +64% |
| 17 | 0.60 (1.00) | 67 | +34% |
| 20 | 0.60 (1.00) | 69 | +38% |
| 23 | 0.60 (1.00) | 72 | +44% |
| 24 | 0.60 (1.00) | 80 | +60% |
| 25 | 0.60 (1.00) | 67 | +34% |
| 26 | 0.60 (1.00) | 64 | +28% |
| 29 | 0.60 (1.00) | 73 | +46% |
| 30 | 0.60 (1.00) | 70 | +40% |
| 33 | 0.60 (1.00) | 65 | +30% |
| 34 | 0.60 (1.00) | 74 | +48% |
| 36 | 1.00 | 58 | +16% |
| 37 | 1.00 | 60 | +20% |
| 39 | 0.60 (1.00) | 73 | +46% |
| VG-1 | 1.00 | 53 | +6% |
| VG-2a | 1.00 | 53 | +6% |
| VG-2b | 1.00 | 54 | +8% |
| VG-3 | 0.60 (1.00) | 53 | +6% |
| VG-4 | 1.00 | 52 | +4% |

*calculated in wt % of the polymeric mediator additive, based on the weight of the aluminum hydroxide used (in parentheses: Quantity of mediator additive added - partial solution from the reaction batch, if the additive was not produced in 100% form)

It is also apparent based on these results that the bending strength of the cured test piece is increased significantly by addition of the mediator additive in the amounts described. The comparison with the values achieved by addition of the comparison products VG-1, -2a, -2b, -3 and -4 also shows that the improvement of the bending strength is far more pronounced than with the known mediator additives in question.

System III
ATH Type: Martinal ON-4608

TABLE 6

Determination of the bending strength of test pieces with the filler Martinal ON-4608.

| Additive | Quantity added in %* | Bending strength in N/mm² | Improvement vs. blank |
|---|---|---|---|
| — | — | 49 | — |
| 6 | 0.60 (1.00) | 74 | +51% |
| 14 | 0.60 (1.00) | 70 | +42% |
| 24 | 0.60 (1.00) | 71 | +44% |
| 25 | 0.60 (1.00) | 73 | +49% |

*calculated in wt % of the polymeric mediator additive, based on the weight of the aluminum hydroxide used (in parentheses: Quantity of mediator additive added - partial solution from the reaction batch, if the additive was not produced in 100% form)

(IIb) Production of the Test Pieces in a $CaCO_3$-Filled Acrylate Resin System

First the acrylate base resin ("acrylate syrup") is produced. This corresponds to the composition mentioned under (IIa).

Later this syrup (i) is mixed with the other components (ii to viii) mentioned in Tab. 7:

TABLE 7

Composition of the resin/filler mixture used in $CaCO_3$-filled systems.

| i | Acrylate syrup | 100 |
|---|---|---|
| ii | EGDMA | 1.5 |
| iii | BYK-A 515 | 0.25 |
| iv | Pergaquick A 150 | 0.25 |
| v | Peroxan BP powder 50 W | 0.75 |
| vi | Carolith 0.2-0.5 NP | 145.4 |
| vii | Carolith 0.5-1.0 NP | 274.8 |
| viii | Durcal 10 | 113.2 |

Measurement of the Bending Strength
(Quantitative Fractions According to Tab. 7)

Example (No Mediator Additive, Comparison Example)

The syrup (component (i)) is placed in a container and the components (ii) to (v) mentioned in Tab. 7 are weighed in in the order of the formula and mixed with a spatula. Then the three $CaCO_3$ types (components (vi) to (viii)) are weighed in, stirred in manually, and then agitated for ½ minute at 930 RPM with a dissolver (Model Pendraulik, type TD-100, 40 mm chopper disk). This filler/resin mixture is cast into a flat mold made of melamine resin (dimensions: 107 mm×205 mm×15 mm). Curing to form a slab is performed at room temperature for 1 hour. Then the slab is stored for 24 hours at 80° C. After curing is complete, test pieces corresponding to the test standard DIN EN ISO 178 (test piece dimensions: 80 mm×15 mm, thickness 6 mm) are cut from the slab with a diamond saw. The bending strength is measured with a Universal testing machine Type 1465 from the Zwick company.

Example (with Mediator Additive)

Exactly the same procedure is followed as during the above-described production of the test pieces without mediator additive. In addition, the quantities of the respective mediator additives specified in Table 8 are added to the mixture components in the dissolver before homogenization.
System V
$CaCO_3$ in Syrup, Mixture of Three $CaCO_3$ Types According to Table 7

TABLE 8

Determination of the bending strength of test pieces with $CaCO_3$ as filler.

| Additive | Quantity added in %* | Bending strength in N/mm² | Improvement vs. blank |
|---|---|---|---|
| — | — | 28.7 | — |
| VG-1 | 1.00 | 29.6 | +3% |
| 6 | 0.60 (1.00) | 38.7 | +35% |
| 6 | 0.18 (0.30) | 37.7 | +31% |
| 13 | 0.6 (1.00) | 36.6 | +28% |
| 14 | 0.6 (1.00) | 35.1 | +22% |
| 16 | 0.6 (1.00) | 32.3 | +13% |

TABLE 8-continued

Determination of the bending strength of test pieces with CaCO₃ as filler.

| Additive | Quantity added in %* | Bending strength in N/mm² | Improvement vs. blank |
|---|---|---|---|
| 29 | 0.6 (1.00) | 36.2 | +26% |
| 39 | 0.6 (1.00) | 32.6 | +14% |

*calculated in wt % of the polymeric mediator additive, based on the weight of the aluminum hydroxide used (in parentheses: Quantity of mediator additive added - partial solution from the reaction batch, if the additive was not produced in 100% form)

Also based on the results with calcium carbonate as filler it is clear that the bending strength of the cured test piece is increased significantly by addition of the mediator additives in the quantities described. The results with mediator additive 6 show that a distinct improvement is achieved even at relatively low concentrations. On the other hand, the low molecular weight compound VG-1 selected as comparison example has practically no effect.

The invention claimed is:

1. Composite formulation containing
   i) 0.01 to 10.00 wt % of a mediator additive component (A),
   ii) 5 to 94 wt % of a filler component (B) and
   iii) 5 to 94 wt % of a binder component (C),
wherein the mediator additive component (A) has a chemical structure containing the structural elements D, P and E shown in general formula (I)

$$[D]_a P[E]_b \tag{I}$$

with
  D the same or different and being selected from the group consisting of (D-I), (D-II), (D-III) and (D-IV)

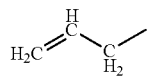
(D-I)

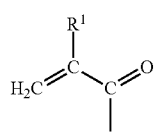
(D-II)

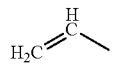
(D-III)

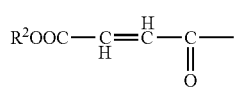
(D-IV)

with R¹ the same or different and represented by hydrogen or CH₃; R² the same or different and represented by a branched or unbranched C₁-C₂₄-alkyl group,
  a the same or different and represented by an integer from 1 to 50,
  E the same or different and represented by hydrogen and/or being selected from the group consisting of (B-I), (B-II), (B-III) and (B-IV)

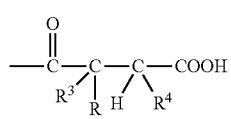
(B-I)

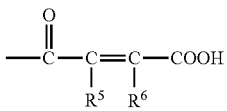
(B-II)

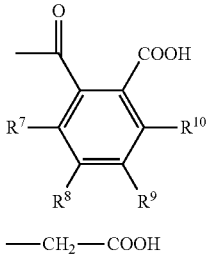
(B-III)

—CH₂—COOH (B-IV)

with R³ and R⁴ in each case the same or different and represent hydrogen or a branched or unbranched C₁-C₁₂-alkyl group; R⁵ and R⁶ in each case are the same or different and represent hydrogen or a branched or unbranched C₁-C₁₂-alkyl group; R⁷, R⁸, R⁹ and R¹⁰ in each case are the same or different and represent hydrogen, COOH or a branched or unbranched C₁-C₁₂-alkyl group,
  b is the same or different and represents an integer from 1 to 50,
  P is the same or different and is represented by a branched or unbranched organic principal group, which contains at least two non-terminal ether oxygen atoms within the principal group,
    wherein the principal organic group represented by P has additional terminal oxygen atoms, the structural elements D and E are each bound directly to these terminal oxygen atoms, and a maximum of 70 mol % of the total structural elements E in the chemical structure according to the general formula (I) are H-atoms, and
    wherein the binder component (C) contains at least 60 wt % of preproducts (C') selected from the group consisting of ethylenically unsaturated polymers, (meth)acrylate resins, and ethylenically unsaturated monomers; said preproducts (C') curable by free radical polymerization with free radical initiators and/or free radical cross-linking with cross-linking agents.

2. Composite formulation according to claim 1, containing
   i) 0.01 to 4.0 wt % of the mediator additive component (A),
   ii) 15 to 84 wt % of the filler component (B), and
   iii) 15 to 84 wt % of the binder component (C).

3. Composite formulation according to claim 1, wherein in the general formula (I) describing the chemical structure of the mediator additive component (A),
   D is present as (D-II) and/or (D-IV), a is represented by an integer from 1 to 8, E comprises (B-I) and/or (B-II), and b is represented by an integer from 1 to 15, wherein a maximum of 50 mol % of the total structural elements E in the chemical structure according to general formula (I) are H-atoms and the organic principal radical represented by P has a molecular weight of at least 200, and at least two of the non-terminal ether oxygen atoms within the principal radical are connected to one another over a bridging linear C₂-C₅ alkylene group segment of an unbranched or branched alkylene group.

4. Composite formulation according to claim 1, wherein the total quantity or a partial quantity of the mediator additive component (A) is present in the form of compounds (A') in which the organic principal group representing the structural element P has structural units that are obtainable by ring-opening polymerization of cyclic ethers containing 3 to 6 ring atoms, wherein the principal organic group optionally contains additional structural units that can be produced by ring-opening polymerization of lactones containing 5 to 7 ring atoms.

5. Composite formulation according to claim 4, wherein the compounds (A') have structural segments of general formula (II)

$$\underset{H_2C}{\overset{R^1}{\underset{|}{C}}}=C\underset{O-(W)_x-}{\overset{O}{\diagdown}}$$  (II)

wherein
R$^1$ is the same or different and is H or CH$_3$
W is the same or different and is a repeat structural unit,
x is the same or different and is an integer from 3 to 100,
wherein the repeat structural unit W is obtained by ring-opening polymerization of a cyclic ether selected from the group comprising (W-I), (W-II), (W-III), (W-IV) and (W-V)
wherein (W-I) epoxide-S$^1$ (W-II) glycidyl ether –O–S$^2$ (W-III) glycidyl ester –O–C(=O)–S$^3$ (W-IV) oxetane with –O–(C$_2$H$_4$O)$_n$–H substituent (W-V) tetrahydrofuran S$^1$ is the same or different and is H, a linear or branched C$_1$ to C$_{24}$ alkyl group, a C$_6$ to C$_{18}$ aryl group, or a C$_6$ to C$_{18}$ arylalkyl group,
S$^2$ is the same or different and is H, a linear or branched C$_1$ to C$_{24}$ alkyl group, a C$_6$ to C$_{18}$ aryl group, or a C$_6$ to C$_{15}$ arylalkyl group,
n is the same or different and is an integer from 0 to 10.

6. Composite formulation according to claim 1, wherein the mediator additive component (A) is produced by a method that has steps i) and ii), in which
in step i) hydroxy-functional preproducts are produced by ring-opening polymerization of oxetanes optionally substituted with hydroxyl groups, wherein the ring-opening polymerization takes place by reacting with said oxetanes an ethylenically unsaturated compound containing at least one hydroxyl group and
in step ii) the hydroxy-functional preproducts are reacted with cyclic carboxylic acid anhydrides.

7. Composite formulation according to claim 6, wherein the oxetanes used in step i) are each present in the form of oxetanes substituted with hydroxyl groups, wherein for the ethylenically unsaturated compound with at least one hydroxyl group used in step i), optionally hydroxyalkyl (meth)acrylate derivatives and/or allyl alcohol derivatives are selected, and the cyclic carboxylic acid anhydrides used in step ii) are optionally present as cyclic aliphatic carboxylic acid anhydrides containing at least 4 carbon atoms.

8. Composite formulation according to claim 7, wherein the hydroxyalkyl (meth)acrylate derivatives are represented by hydroxyalkyl (meth)acrylate and/or ether species produced by alkoxylation of hydroxyalkyl (meth)acrylate and contain a maximum of 20 alkoxy structural units, and the allyl alcohol derivatives are present in the form of allyl alcohol and/or by alkoxylation of allyl alcohol, containing a maximum of 20 alkoxy structural units.

9. Composite formulation according to claim 1, wherein at least 60 wt % of the filler component (B) is present in the form of filler component species (B') which in each case according to DIN EN ISO 787-9 have a pH of at least 6.0.

10. Composite formulation according to claim 1, wherein at least 60 wt % of the filler component (B) is present in the form of filler component species (B') which in each case contain carbonates, hydrogen carbonates, sulfates and/or hydrogen sulfates of the elements calcium, magnesium and/or aluminum; and/or oxides, hydroxides and/or oxide-hydroxides of aluminum; and/or mica and/or aluminosilicates and/or talc and/or silicas.

11. Composite formulation according to claim 1, wherein the binder component (C) contains at least 90 wt % of a polymer matrix preproduct consisting of the following components:
(meth)acrylic resins and/or unsaturated polyester resins,
ethylenically unsaturated monomers, optionally styrene, substituted styrenes, (meth)acrylates and/or (meth)acrylamides,
species suitable as free radical initiators, optionally peroxide compounds and
optionally, cross-linking agents selected from di-, tri-, and higher-functional (meth)acrylates, di-, tri- and polyvinyl-substituted benzene derivatives, di-, tri- and higher-functional vinyl or allyl (poly) ethers.

12. Composite produced by curing of a composite formulation according to claim 1.

13. A composite according to claim 12 comprising a material for a molded article optionally in the form of a worktop, for kitchens or for countertops or bar surfaces, molded articles for the sanitary sector, bathtubs, washbasins, toilet bowls, pipes, gutters, shafts, connectors, segmented components, slabs, non-woven cloth, bases, articles of clothing, walls, ceilings, artificial marble, frames, containers, bottles, cups, basins, decorative articles, sinks, tanks, troughs, or molded articles for reconstruction of motor vehicles, aircraft or boats.

14. Composite formulation according to claim 3, wherein a maximum of 30 mol % of the total structural elements E in the chemical structure according to general formula (I) are H-atoms.

15. Composite formulation according to claim 3, wherein a maximum of 15 mol % of the total structural elements E in the chemical structure according to general formula (I) are H-atoms.

16. Composite formulation according to claim 9, wherein at least 60 wt % of the filler component (B) is present in the form of filler component species (B') which in each case according to DIN EN ISO 787-9 have a pH of at least 7.5.

17. Composite formulation according to claim 1, wherein
P is the same or different and is represented by a branched or unbranched organic principal group, which contains over three non-terminal ether oxygen atoms within the principal group,
wherein the principal organic group represented by P has additional terminal oxygen atoms, the structural elements D and E are each bound directly to these terminal oxygen atoms, and a maximum of 70 mol % of the total structural elements E in the chemical structure according to the general formula (I) are H-atoms.

* * * * *